(12) United States Patent
Fraser et al.

(10) Patent No.: US 9,963,015 B1
(45) Date of Patent: May 8, 2018

(54) VENT OUTLET ASSEMBLY

(71) Applicant: Ultra Manufacturing Limited, Kitchener (CA)

(72) Inventors: Jason Noel Fraser, Waterloo (CA); Ionut Jan Caragea, Kitchener (CA)

(73) Assignee: Ultra Manufacturing Limited, Kitchener, ON (CA)

( * ) Notice: Subject to any disclaimer, the term of this patent is extended or adjusted under 35 U.S.C. 154(b) by 226 days.

(21) Appl. No.: 15/000,119

(22) Filed: Jan. 19, 2016

Related U.S. Application Data

(60) Provisional application No. 62/104,145, filed on Jan. 16, 2015.

(51) Int. Cl.
*B60H 1/34* (2006.01)

(52) U.S. Cl.
CPC ................ *B60H 1/3414* (2013.01)

(58) Field of Classification Search
CPC ......... B60H 1/3414; B60H 1/34; B60H 1/345
USPC ................ 454/152–155, 108–109, 284–332
See application file for complete search history.

(56) References Cited

U.S. PATENT DOCUMENTS

| | | | |
|---|---|---|---|
| 56,284 A | 7/1866 | Smith et al. | |
| 3,103,155 A | 9/1963 | Boylan et al. | |
| 6,176,775 B1 | 1/2001 | Volk | |
| 6,487,929 B2 | 12/2002 | Schneider | |
| 7,201,650 B2 | 4/2007 | Demerath et al. | |
| 8,662,970 B2 | 3/2014 | Nagasaka et al. | |
| 8,834,241 B2 | 9/2014 | Uhlenbusch | |
| 8,974,273 B2 | 3/2015 | Uhlenbusch | |
| 9,046,277 B2 | 6/2015 | Gruedl | |
| 9,163,848 B2 | 10/2015 | Doll et al. | |
| 2006/0223430 A1* | 10/2006 | Shibata | B60H 1/3421 454/155 |
| 2011/0045758 A1 | 2/2011 | Bastian | |
| 2014/0357179 A1 | 12/2014 | Londiche et al. | |

FOREIGN PATENT DOCUMENTS

| | | |
|---|---|---|
| DE | 202015102026 U1 | 7/2015 |
| WO | WO2005021301 A1 | 3/2005 |

OTHER PUBLICATIONS

Machine-generated English language translation of DE 20 2015 102 026 U1.
Machine-generated English translation of WO/2005/021301.

* cited by examiner

*Primary Examiner* — Vivek Shirsat

(57) ABSTRACT

A vent outlet assembly for guiding an air flow including an inlet guide extending between first and second ends thereof and positioned inside a housing and an outlet guide extending between leading and trailing ends thereof and positioned inside the housing. The inlet guide and the outlet guide are pivotable about respective axes and positioned to cooperate to direct an outlet part of the air flow through the housing. The vent outlet assembly includes a connecting subassembly to simultaneously position the inlet and outlet guides in corresponding positions.

2 Claims, 29 Drawing Sheets

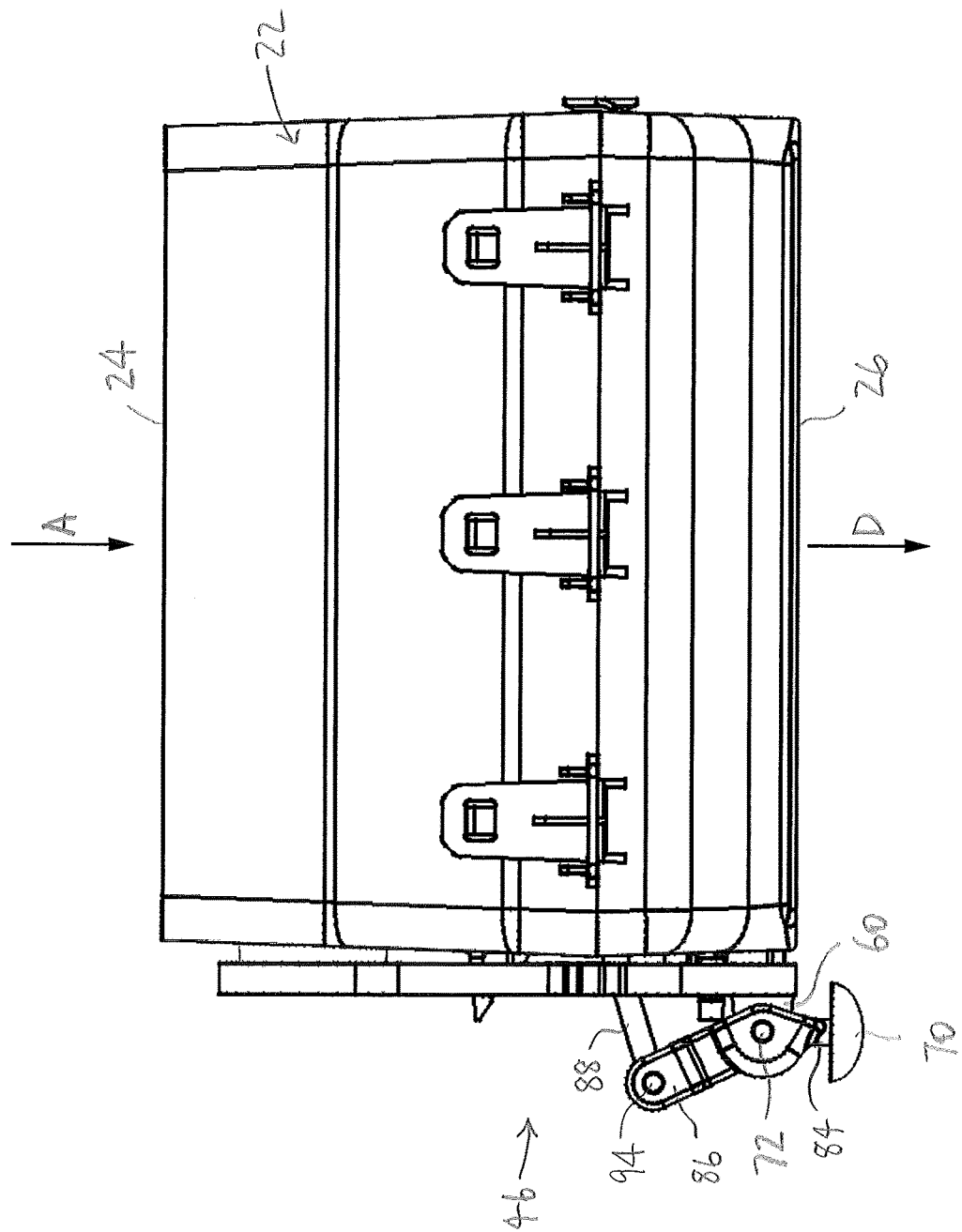

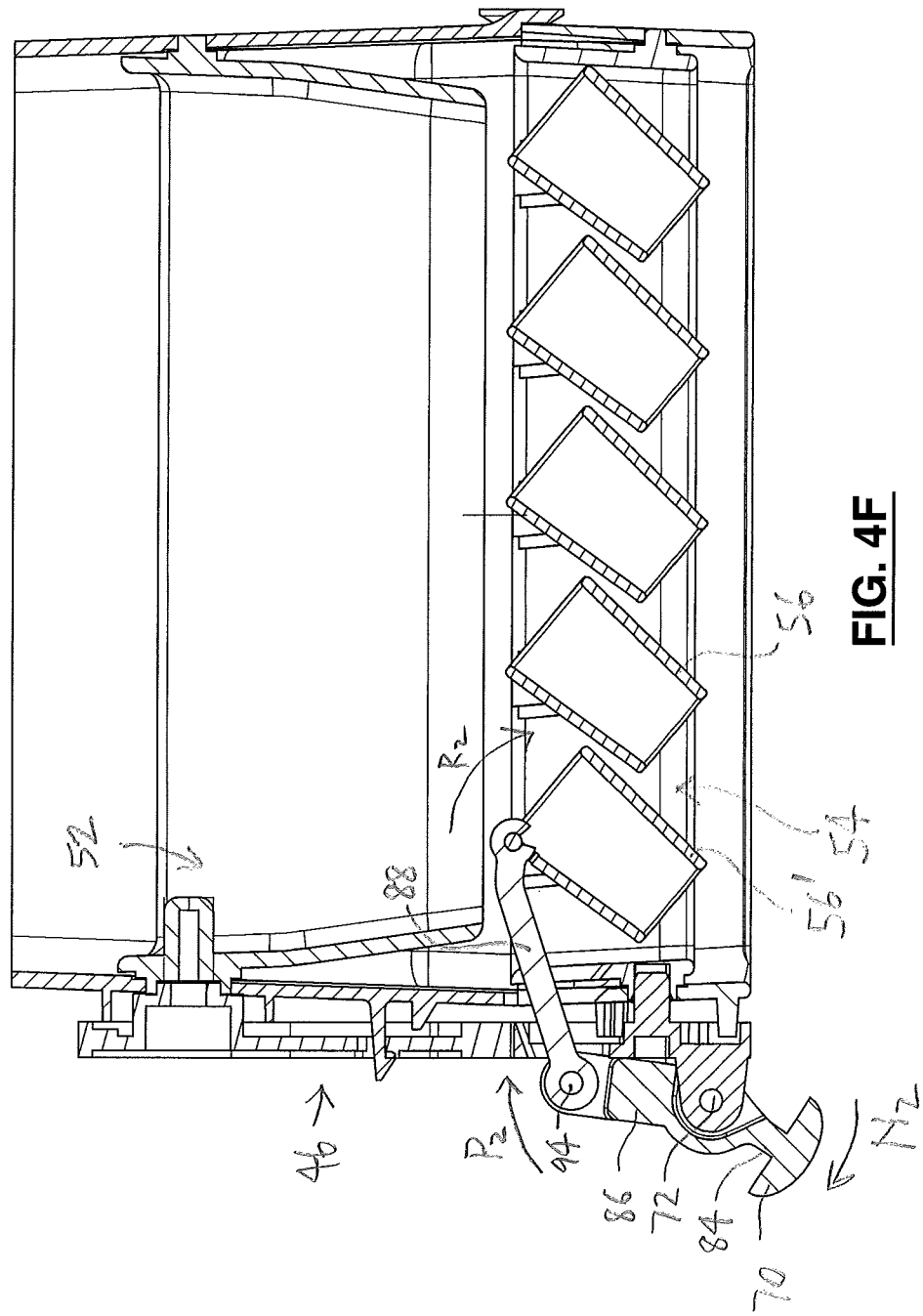

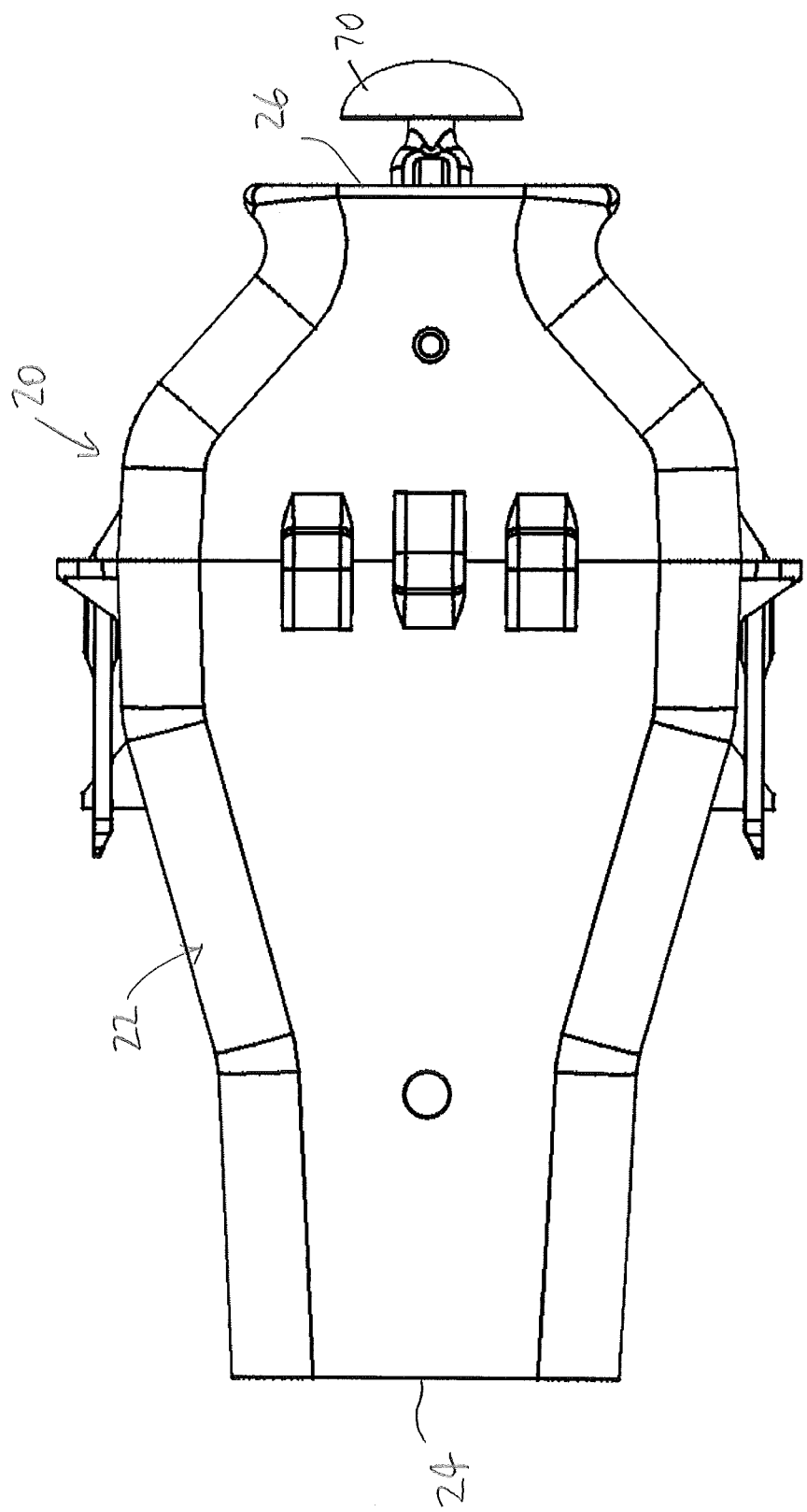

VENT OUTLET ASSEMBLY

CROSS-REFERENCE TO RELATED APPLICATIONS

This application claims the benefit of U.S. Provisional Patent Application No. 62/104,145, filed on Jan. 16, 2015, the entirety of which is hereby incorporated by reference.

FIELD OF THE INVENTION

The present invention is a vent outlet assembly for guiding an air flow.

BACKGROUND OF THE INVENTION

Air vents in automobile interiors, through which air flow is directed for the comfort of the passengers, typically are provided with elements to permit the vents to be opened or closed, and to permit adjustments of the direction of the air flow exiting the vent. The vent typically is located in a dashboard, but may be located elsewhere. The vent may be partly defined by a housing.

For example, in the prior art, the air flow through the housing in the vent is controlled by louvers located at an exit portal through which the air flow exits the vent. These louvers may be movable between open and closed conditions, e.g., vertically (i.e., up or down) or horizontally (i.e., side to side) by a user.

The typical automobile interior vent may include other elements that are movable relative to each other, to enable the user to direct the flow of air as the user desires. However, as is known, the air flow inside the conventional housing may be directed partially against internal surfaces of the housing. This is undesirable because of the turbulent air flow and inefficiencies that result.

SUMMARY OF THE INVENTION

There is a need for an assembly and a method that overcome or mitigate one or more of the defects or disadvantages of the prior art. Such disadvantages or defects are not necessarily included in those listed above.

In its broad aspect, the invention provides a vent outlet assembly for guiding an air flow including a housing extending between an inlet end, into which the air flow is channelled, and an outlet end, from which the air flow exits the housing, the housing having a lower wall and an upper wall, each extending between the inlet and the outlet ends of the housing. The lower and upper walls at least partially define a cavity therebetween. The vent outlet assembly also includes one or more inlet guides extending between first and second ends thereof and positioned at least partially in the cavity, the second end being located intermediate between the inlet and outlet ends, and the first end being located upstream to the air flow relative to the second end. In addition, the vent outlet assembly includes one or more outlet guides extending between leading and trailing ends thereof and positioned at least partially in the cavity, the leading end being positioned proximal to, and at least partially aligned with, the second end of the inlet guide, and the trailing end being positioned downstream to the air flow relative to the leading end. The inlet guide is pivotable between a first inlet position, in which the second end of the inlet guide is positioned proximal to the lower wall of the housing, and a second inlet position, in which the second end of the inlet guide is positioned proximal to the upper wall of the housing. The outlet guide is pivotable between a first outlet position, in which the leading end is positioned proximal to the lower wall of the housing, and a second outlet position, in which the leading end of the outlet guide is positioned proximal to the upper wall. The inlet guide is positioned relative to the outlet guide for guiding an inlet part of the air flow toward the outlet guide. The vent outlet assembly also includes a connecting subassembly to simultaneously position the inlet guide and the outlet guide in the first inlet position and in the first outlet position respectively, and to simultaneously position the inlet guide and the outlet guide in the second inlet position and in the second outlet position respectively. The connecting subassembly is also for simultaneously moving the inlet guide between the first and second inlet positions and the outlet guide between the first and second outlet positions relative to each other, so that an outlet part of the air flow included in the inlet part is directed through the outlet guide.

In another aspect, the invention provides a method of at least partially directing an air flow from an inlet end of a housing to an outlet end thereof. The method includes the steps of providing one or more outlet guides for guiding at least an outlet part of the air flow to the outlet end, the outlet guide being pivotable about an outlet guide axis, and providing one or more inlet guides positioned upstream from the outlet guide, for guiding an inlet part including the outlet part of the air flow to the outlet guide, the inlet guide being pivotable about an inlet guide axis. The inlet guide and the outlet guide are operatively connected for corresponding pivoting movement thereof about the inlet and the outlet guide axes respectively. The air flow is channelled into the housing at the inlet end. The outlet guide is pivoted about the outlet guide axis, to guide the outlet part of the air flow in a selected direction substantially transverse to the outlet guide axis.

BRIEF DESCRIPTION OF THE DRAWINGS

The invention will be better understood with reference to the attached drawings, in which:

FIG. 4A is a top view of the vent outlet assembly of FIGS. 1-3;

FIG. 4F is a cross-section of the vent outlet assembly of FIG. 4B in which each outlet barrel is positioned to direct the air flowing through it in a second transverse direction;

FIG. 5 is a first side view of the vent outlet assembly of FIGS. 1-4D;

DETAILED DESCRIPTION

Figure 6:
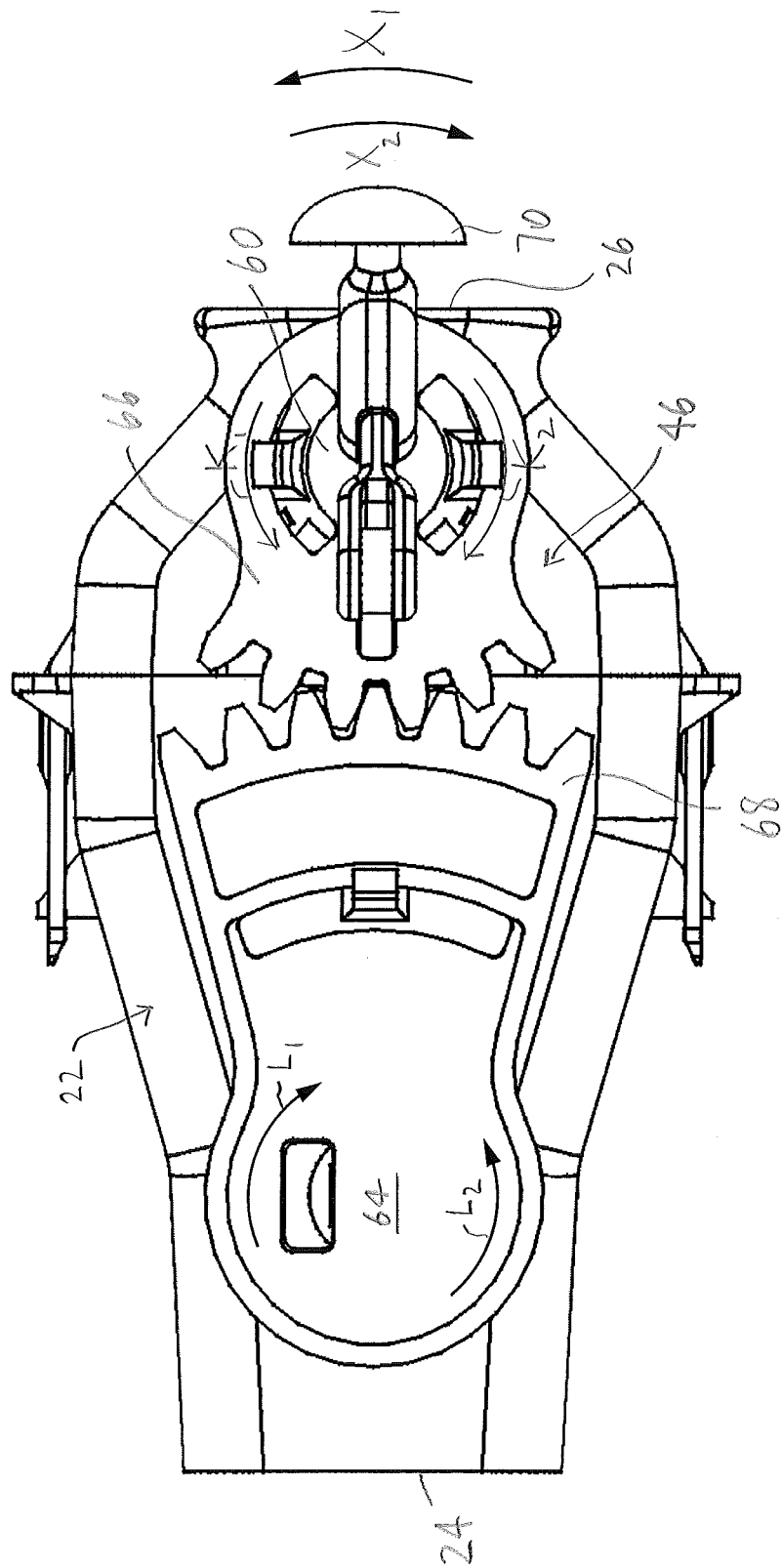
FIG. 6 is a second side view of the vent outlet assembly of FIGS. 1-4D.
Figure 7:
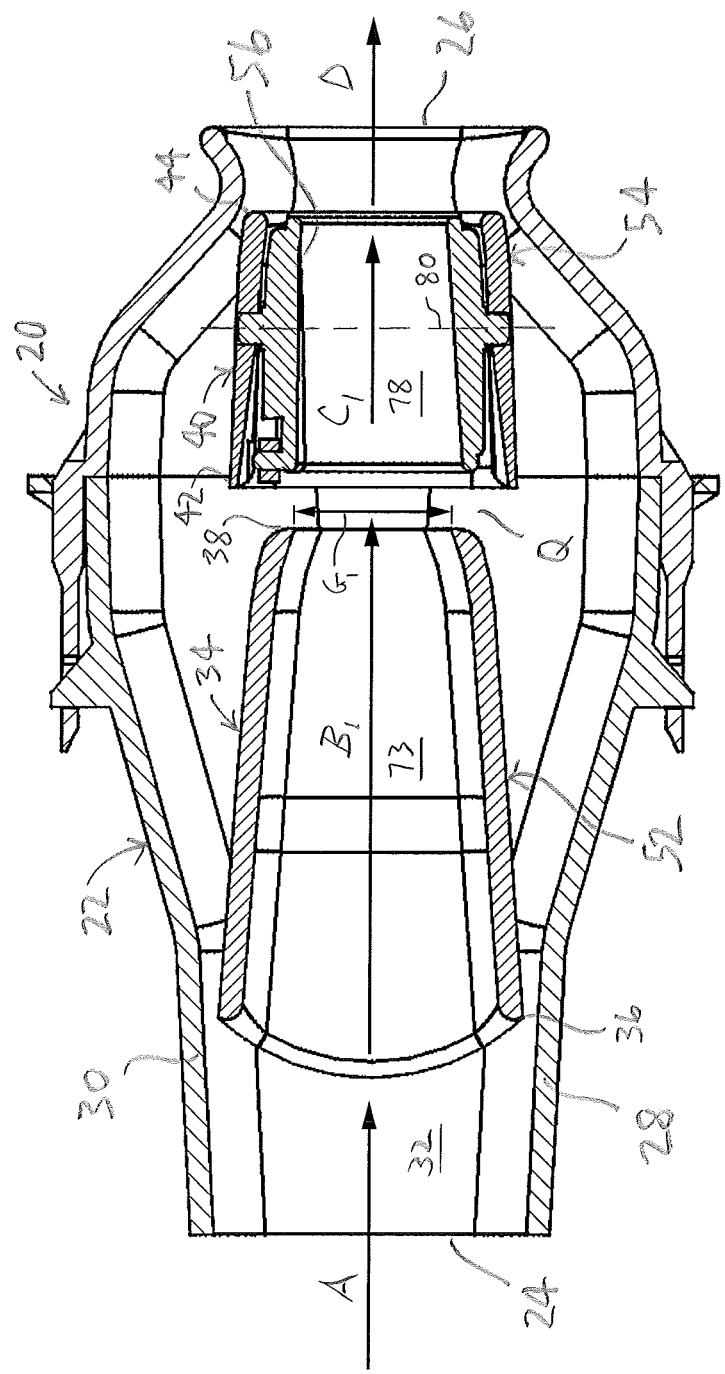
FIG. 7 is a longitudinal cross-section of the vent outlet assembly of FIGS. 1-6 in which an inlet guide and an outlet guide mounted inside a housing are substantially aligned.
Figure 8:
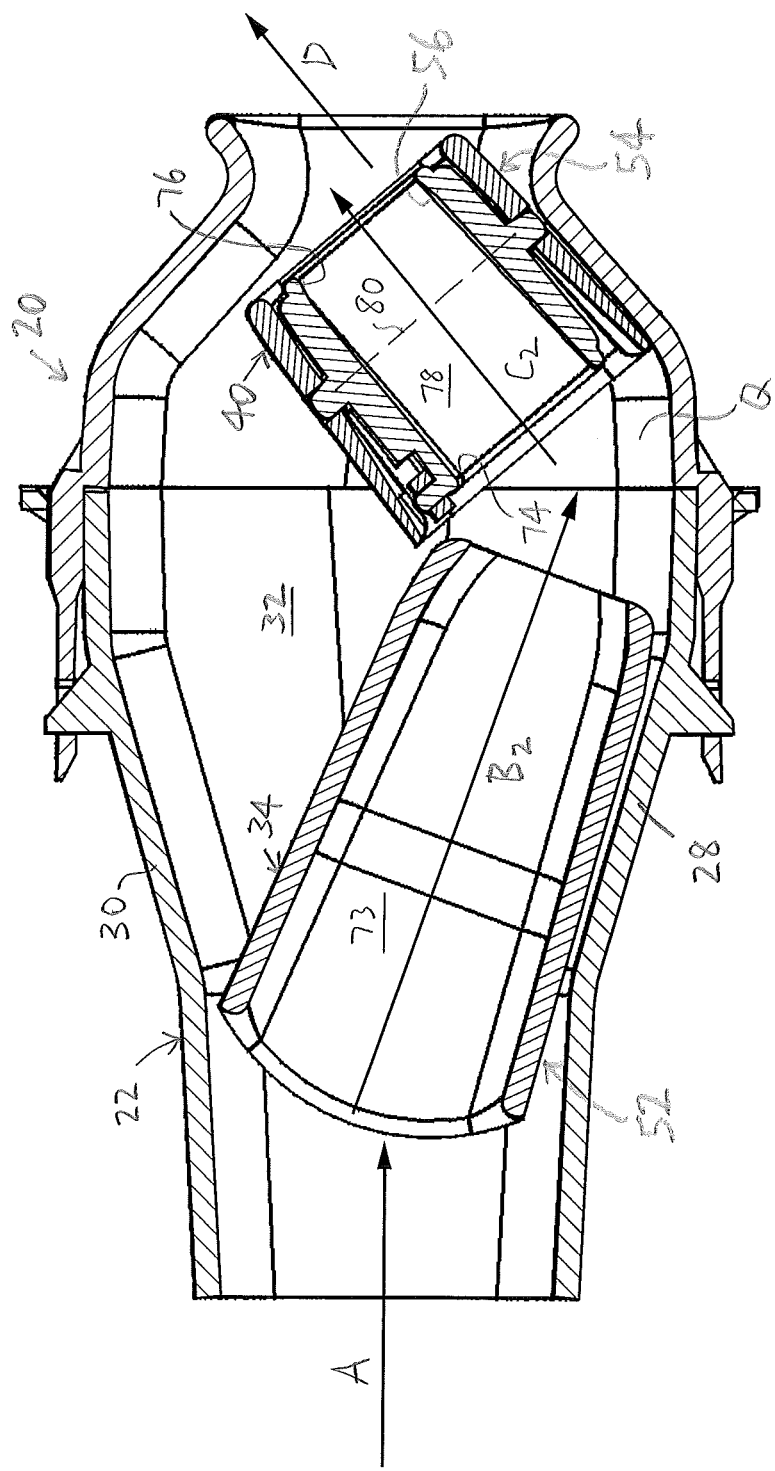
FIG. 8 is a longitudinal cross-section of the vent outlet assembly of FIGS. 1-6 in which a second end of the inlet guide is positioned proximal to a lower wall of the housing and a leading end of the outlet guide is positioned proximal to the lower wall.
Figure 9:
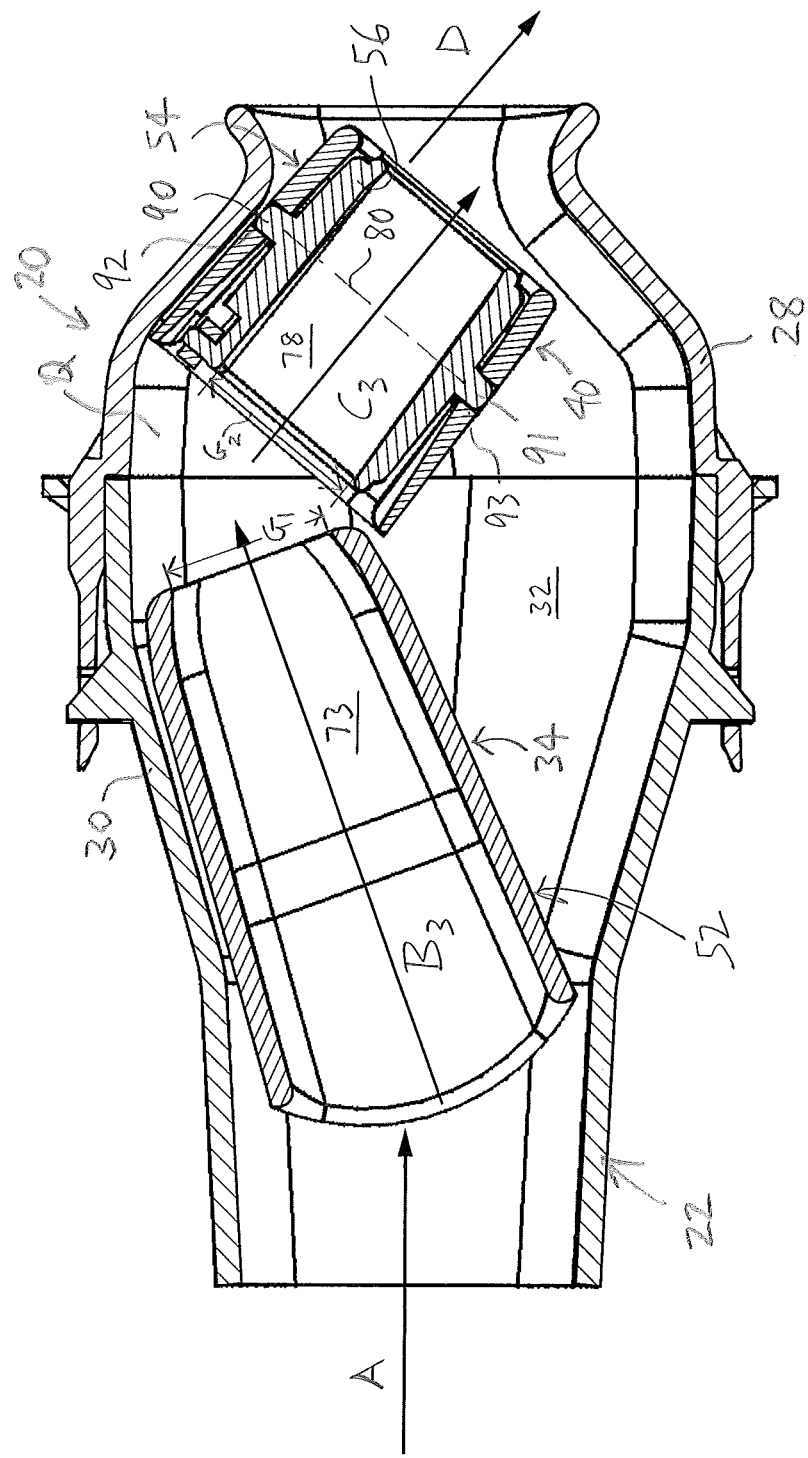
FIG. 9 is a longitudinal cross-section of the vent outlet assembly of FIGS. 1-6 in which the second end of the inlet guide is positioned proximal to an upper wall of the housing and the leading end of the inlet guide is positioned proximal to the upper wall.

In the attached drawings, like reference numerals designate corresponding elements throughout. Reference is first made to FIGS. 1-9 to describe an embodiment of a vent outlet assembly of the invention indicated generally by the numeral 20. The vent outlet assembly 20 is for guiding an air flow, and preferably includes a housing 22 extending between an inlet end 24, into which the air flow is channelled, and an outlet end 26, from which the air flow exits the housing 22 (FIG. 4A). As can be seen in FIGS. 7-9, the housing 22 preferably includes a lower wall 28 and an upper wall 30, each extending between the inlet and the outlet ends 24, 26 of the housing 22. Preferably, the lower and upper walls 28, 30 at least partially define a cavity 32 therebetween (FIGS. 7-9). It is also preferred that the vent outlet assembly 20 includes one or more inlet guides 34 extending between first and second ends 36, 38 thereof and positioned at least partially in the cavity 32, the second end 38 being located intermediate between the inlet and outlet ends 24, 26, and the first end 36 being located upstream to the air flow relative to the second end 38 (FIG. 7). Preferably, the vent outlet assembly 20 also includes one or more outlet guides 40 extending between leading and trailing ends 42, 44 thereof and positioned at least partially in the cavity 32 (FIG. 7). It is also preferred that the leading end 32 is positioned proximal to, and at least partially aligned with, the second end 38 of the inlet guide 34, and the trailing end 44 is positioned downstream to the air flow relative to the leading end 42 (FIG. 7). The inlet guide 34 preferably is pivotable between a first inlet position (FIG. 8), in which the second end 38 of the inlet guide 34 is positioned proximal to the lower wall 28 of the housing 22, and a second inlet position (FIG. 9), in which the second end 38 of the inlet guide 34 is positioned proximal to the upper wall 30 of the housing 22. Also, the outlet guide 40 preferably is pivotable between a first outlet position (FIG. 8), in which the leading end 42 is positioned proximal to the lower wall 28 of the housing 22, and a second outlet position (FIG. 9), in which the leading end 42 of the outlet guide 40 is positioned proximal to the upper wall 30. As will be described, the inlet guide 34 preferably is positioned relative to the outlet guide 40 for guiding an inlet part of the air flow toward the outlet guide 40. The vent outlet assembly 20 preferably also includes a connecting subassembly 46 to simultaneously position the inlet guide 34 and the outlet guide 40 in the first inlet position and in the first outlet position respectively, and to simultaneously position the inlet guide 34 and the outlet guide 40 in the second inlet position and in the second outlet position respectively (FIGS. 1-4B, 4E, 4F, and 6). As will be described, the connecting subassembly 46 also simultaneously moves the inlet guide 34 between the first and second inlet positions and the outlet guide 40 between the first and second outlet positions respectively relative to each other, so that an outlet part of the air flow (included in the inlet part) is directed through the outlet guide 40. As will also be described, the outlet part of the air flow is a portion of the inlet part of the air flow. A small gap "Q" is defined between the inlet and outlet guides 34, 40. However, the gap "Q" is believed to have minimal impact on the air flow through the vent outlet assembly 20. The vent outlet assembly 20 causes the air flow through it to have only a minimal pressure drop.

As can be seen in FIGS. 7-9, the inlet guide 34 preferably is pivotable between the first and second inlet positions about an inlet guide axis 48 (FIG. 4B). It will be understood that the inlet guide 34 is positionable in any position between the first and second inlet positions. Preferably, the inlet guide axis 48 is substantially horizontal.

It can also be seen in FIGS. 7-9 that the outlet guide 40 is pivotable between the first and second outlet positions about an outlet guide axis 50 (FIG. 4B). It will be understood that the outlet guide 40 is positionable in any position between the first and second outlet positions. Preferably, the outlet guide axis 50 is substantially horizontal.

The inlet and outlet guides may have any suitable structure. In the embodiment of the vent outlet assembly 20 illustrated in FIGS. 1-9, the inlet guide 34 preferably includes one or more inlet sleeves 52 (FIGS. 4B, 4E, 4F, and 7-9). Also, in one embodiment, the outlet guide 40 preferably includes one or more outlet sleeves 54 (FIGS. 4B, 4E, 4F, and 7-9). In FIGS. 7-9, it can be seen that the inlet part of the air flow is directed through the inlet sleeve 52. As will be described, it is preferred that the outlet sleeve is at least partially aligned with the inlet sleeve. As can be seen in FIGS. 4B, 4E, and 4F, the outlet guide 40 preferably also includes one or more outlet barrels 56 that preferably are mounted in the outlet sleeve 54, for directing a portion of the outlet part of the air flow therethrough, as will also be described.

Figure 1:
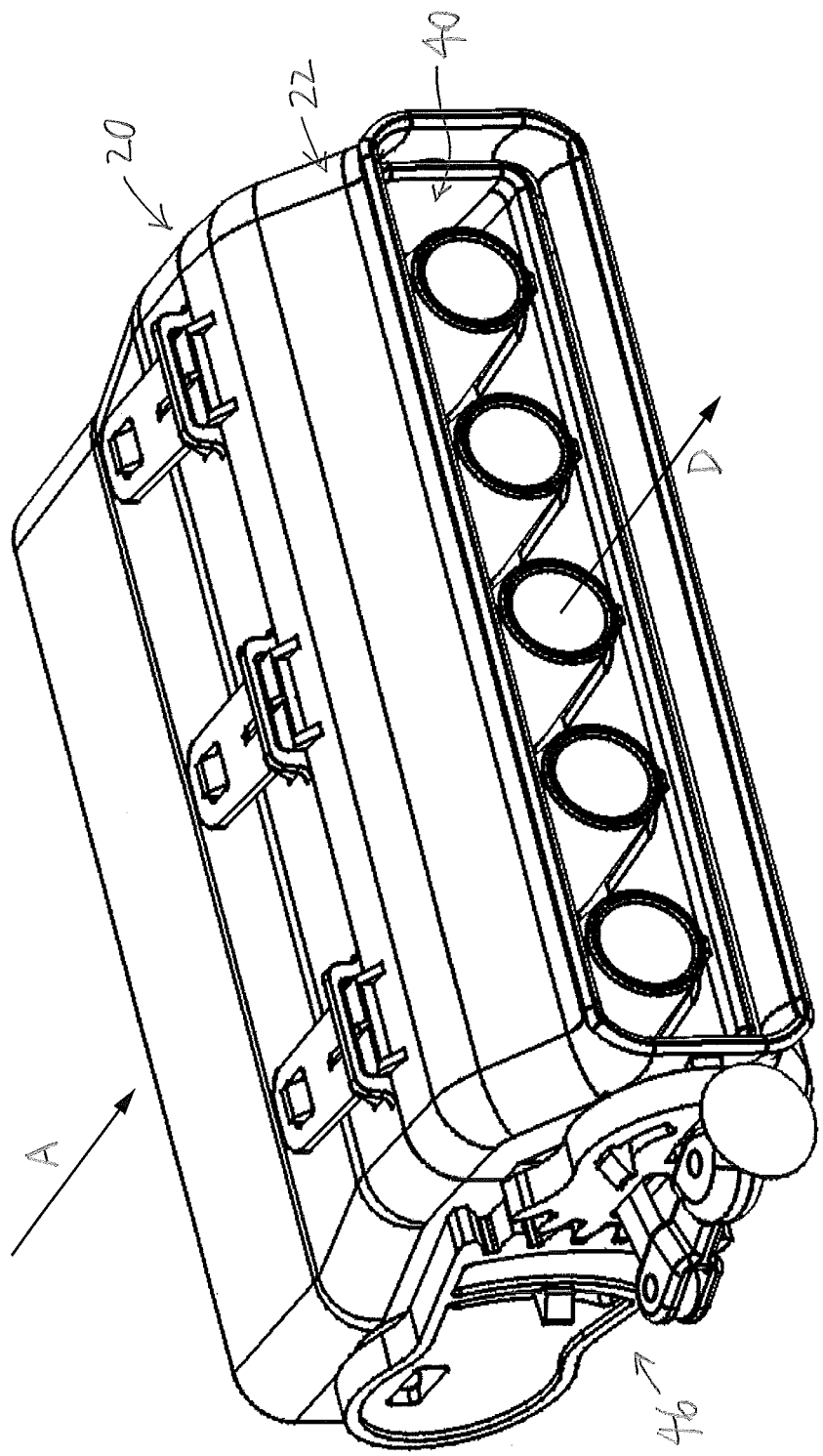
FIG. 1 is an isometric view of an embodiment of a vent outlet assembly of the invention.

As can be seen in FIGS. 1, 4A, and 4B, the air flow is directed into the inlet end 24 of the housing 22 (as generally indicated by arrow "A"), and the air flow exits the outlet assembly 20 via the outlet end 26 (as generally indicated by arrow "D"). In FIG. 4B, the general direction of the air flow through the inlet guide 34 is indicated by arrow "B", and the general direction of the air flow through the outlet guide 40 is indicated by arrow "C".

In FIGS. 7, 8, and 9, the inlet part of the air flow is schematically represented by arrows "$B_1$", "$B_2$", and "$B_3$" respectively. Also, in FIGS. 7, 8, and 9, the outlet part of the air flow is schematically represented by arrows "$C_1$", "$C_2$", and "$C_3$" respectively.

Figure 2:
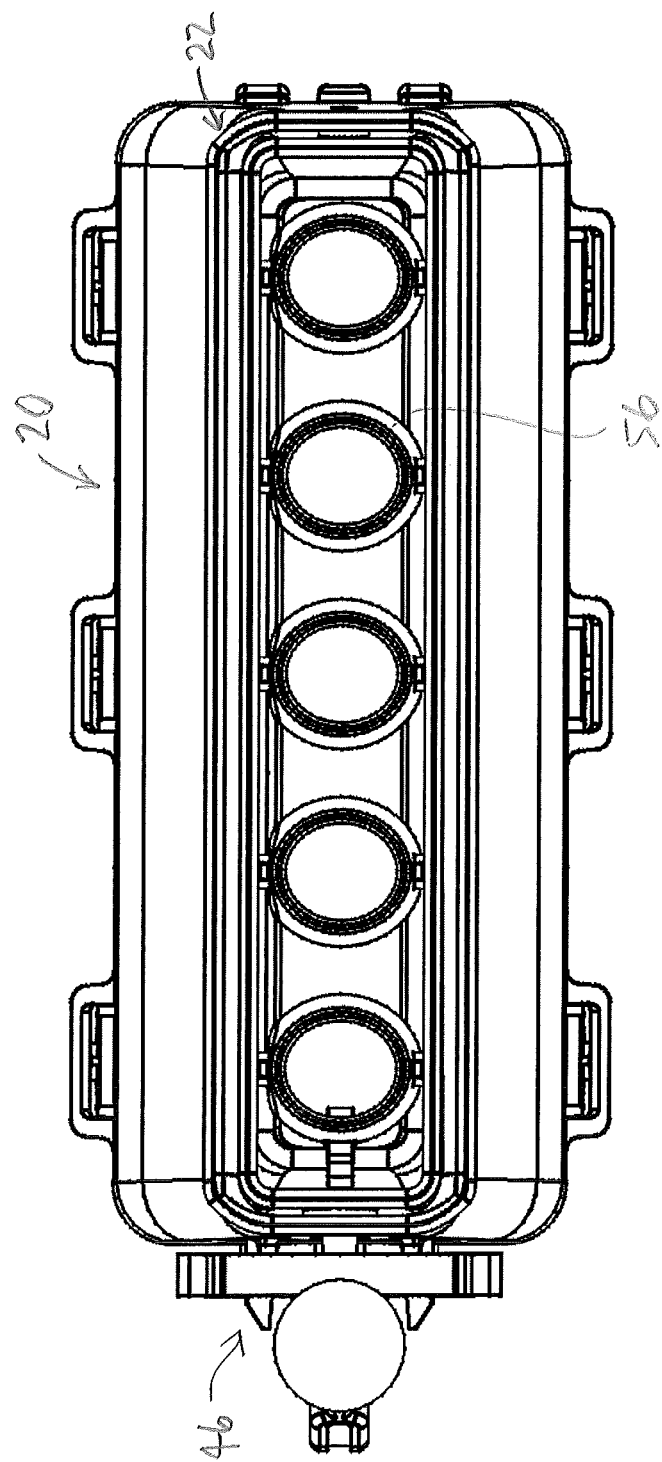
FIG. 2 is a front view of the vent outlet assembly of FIG. 1.
Figure 3:
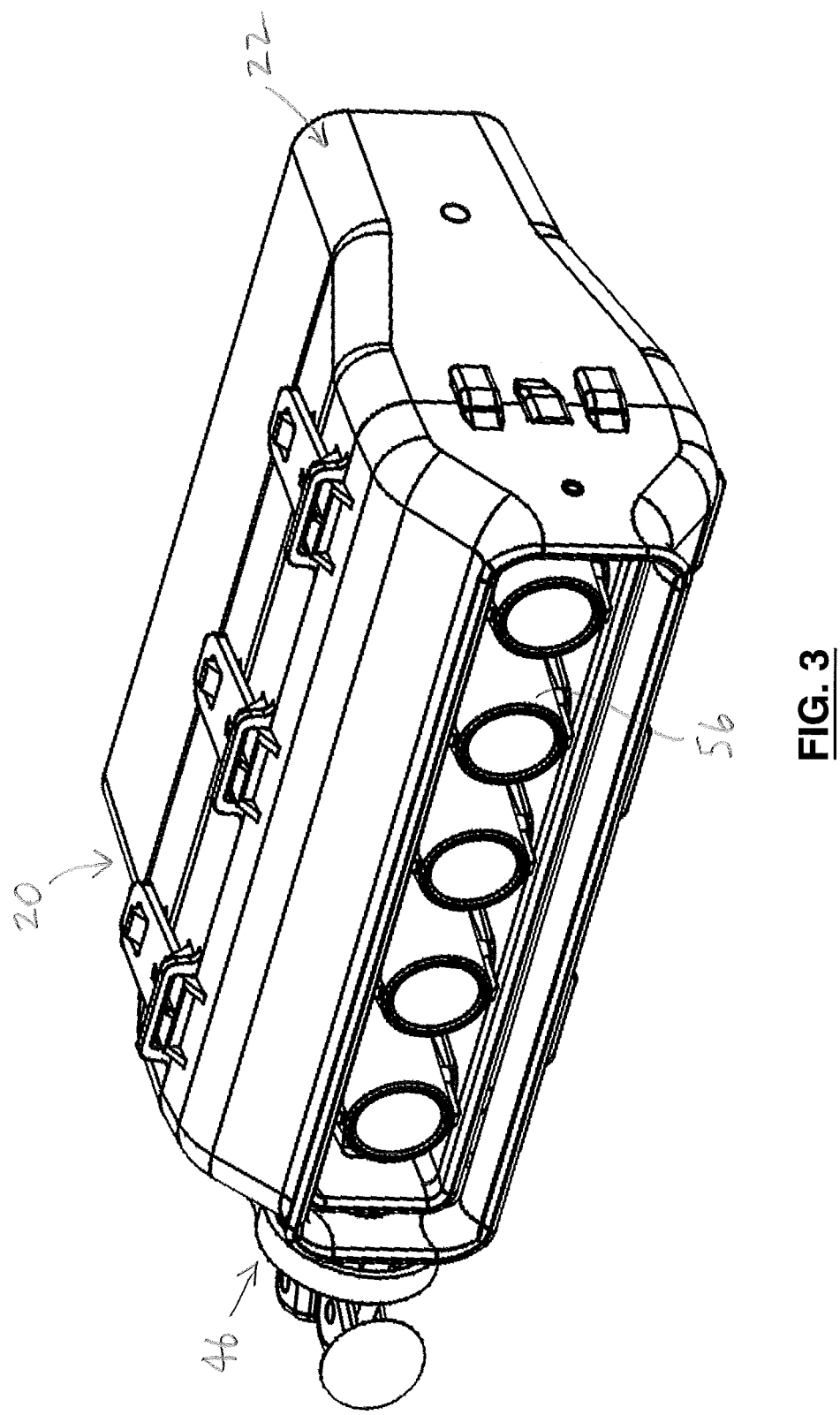
FIG. 3 is another isometric view of the vent outlet assembly of FIGS. 1 and 2.
Figure 4B:
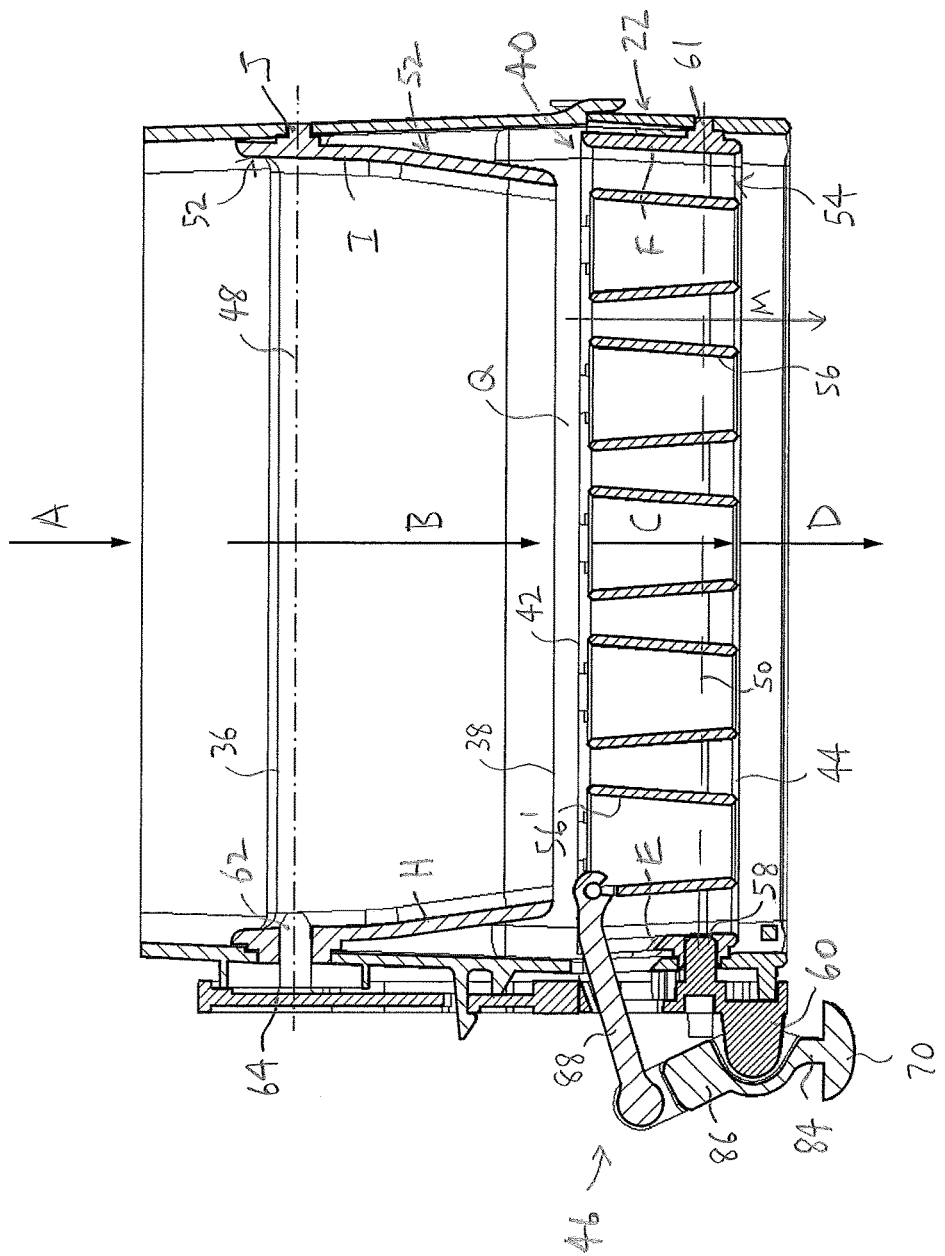
FIG. 4B is a cross-section of the vent outlet assembly of FIG. 4A.

In one embodiment, and as shown in FIGS. 1-3, the outlet guide 40 preferably includes a number of the outlet barrels 56. The outlet guide 40 preferably includes an outlet sleeve 54, and the barrels 56 preferably are mounted inside the outlet sleeve 54. As can be seen in FIG. 4B, the outlet sleeve 54 preferably includes sidewalls "E" and "F". The connecting subassembly 46 preferably includes an outlet projection 58 secured to the sidewall "E" that is pivotable relative to the housing 22. From the sidewall "E", the outlet projection 58 extends through the housing 22 to a knob element 60 that is positioned outside the housing 22, for easy access by a user (FIG. 4B). The knob element 60 is also included in the connecting subassembly 46 (FIG. 6).

As can also be seen in FIG. 4B, the outlet sleeve 54 preferably also includes a pin 61 extending outwardly from the sidewall "F" and pivotably mounted in the housing 22.

From the foregoing, it can be seen that the outlet sleeve 54 is pivotable about the outlet guide axis 50, which is defined by the outlet projection 58 and the pin 61. The knob element 60 rotates about the outlet guide axis 50 with the outlet sleeve 54, because the knob element 60 is secured to the outlet sleeve 54. From the foregoing, it can be seen that pivoting movement of the outlet sleeve 54 between the first and second outlet positions also moves the outlet barrels 56 mounted therein between the first outlet position (FIG. 8) and the second outlet position (FIG. 9). Such pivoting movement of the outlet sleeve 54 is effected by rotating the knob element 60 about the outlet guide axis 50.

In one embodiment, the connecting subassembly 46 also preferably includes an inlet projection 62 secured to a sidewall "H" of the inlet sleeve 52 (FIG. 4B). The inlet projection 62 extends through the housing 22, and is pivotably mounted in the housing 22. The inlet projection 62 preferably is also secured to an external element 64 (FIGS. 4B, 6). The projection 62 preferably is also secured to the sidewall "H" of the inlet sleeve 52, so that the inlet sleeve 52 rotates with the inlet projection 62. The inlet sleeve 52 preferably also includes another sidewall "I" opposite to the sidewall "H" (FIG. 4B). Preferably, the inlet sleeve 52 includes another pin "J" extending from the sidewall "I" and pivotably mounted in the housing 22. As can be seen in FIG. 4B, the inlet guide axis 48 is defined by the inlet projection 62 and the pin "J".

From the foregoing, it can be seen that the inlet sleeve 52 is pivotable about the inlet guide axis 48. The external element 64 rotates about the inlet guide axis 48 with the inlet sleeve 52. Accordingly, the inlet sleeve 52 is pivotable between the first and second inlet positions (FIGS. 8, 9) by rotation of the external element 64 about the inlet guide axis 48.

Those skilled in the art would appreciate that the inlet guide and the outlet guide may be linked for simultaneous, cooperating movement about the inlet and outlet guide axes respectively in different ways. In one embodiment, the connecting subassembly 46 preferably also includes meshably engaged front and rear gears 66, 68 (FIG. 6), to cause the pivoting movements of the inlet sleeve 52 and the outlet sleeve 54 to be substantially simultaneous. In one embodiment, the knob element 60 is secured to (or integrally formed with) the front gear 66, so that the front gear 66 and the knob element 60 rotate together about the outlet guide axis 50. Similarly, the external element 64 preferably is secured to or integrally formed with the rear gear 68, so that the external element 64 and the rear gear 68 rotate together about the inlet guide axis 48 (FIGS. 4B, 6).

As noted above, the inlet sleeve 52 is secured to the external element 64, and rotates with the external element 64 about the inlet guide axis 48. Accordingly, the inlet sleeve 52 rotates with the rear gear 66 about the inlet guide axis 48. Also, the outlet sleeve 54 is secured to the knob element 60, and rotates with the knob element 60 about the outlet guide axis 50. The outlet sleeve 54 rotates with the forward gear 64 about the outlet guide axis 50.

From the foregoing, it can be seen that rotational movement of either the front gear 66 or the rear gear 68 will result in corresponding rotational movement of the other gear, i.e., the front gear 66 or the rear gear 68, as the case may be. In one embodiment, it is preferred that the rotational movement is initiated at the front gear 66, as will be described.

In one embodiment, the connecting subassembly 46 preferably also includes a handle 70 formed so it can easily be grasped by the user. As can be seen in FIG. 4A, it is preferred that the handle 70 is pivotably connected to the knob element 60 by a pivot pin 72. Preferably, the pivot pin 72 is positioned substantially orthogonal to the outlet guide axis 50. This permits the user to cause the knob element 60 to rotate about the outlet guide axis 50 by moving the handle 70 about the outlet guide axis 50. Accordingly, when the user wishes to adjust the direction of the air flow exiting the outlet end 26 of the housing 22 in a generally vertical direction (i.e., upwardly or downwardly), the user moves the handle 70 in the appropriate direction.

For example, as can be seen in FIG. 6, when the handle 70 is moved upwardly (i.e., in the direction indicated by arrow "$X_1$"), this movement causes the knob element 60 and the front gear 66 to rotate in a counter clockwise direction (as viewed in FIG. 6), as indicated by arrow "$K_1$". Such rotation causes corresponding rotation of the rear gear 68, as indicated by arrow "$L_1$" in FIG. 6.

It will be understood that, at the same time, the rotation of the knob element 60 in the counter clockwise direction (as illustrated in FIG. 6) causes corresponding rotation of the outlet sleeve 54 in the counter clockwise direction. As can be seen in FIGS. 7-9, the counter clockwise pivoting of the outlet sleeve 54 may continue (if desired) until the outlet guide is in the first outlet position.

Similarly, downward movement of the handle 70 (i.e., in the direction indicated by arrow "$X_2$" in FIG. 6) causes the front gear 66 to rotate clockwise (as viewed in FIG. 6), as indicated by arrow "$K_2$" in FIG. 6. The clockwise rotation of the front gear 66 also causes corresponding counter clockwise rotation of the rear gear 68, as indicated by arrow "$L_2$" (FIG. 6).

As noted above, the inlet sleeve 52 is connected to the external element 64 and the rear gear 68 by the inlet projection 62, which is secured to each of the inlet sleeve 52 and the rear gear 68. In addition, the outlet sleeve 54 is connected to the knob element 60 and the front gear 66 by the inlet projection 58. Accordingly, rotational movement of the front gear 66 causes corresponding rotational movement of the outlet sleeve 54, i.e., rotational movement of the outlet barrels 56 mounted in the outlet sleeve 54.

Similarly, rotational movement of the rear gear 68 causes corresponding rotational movement of the inlet sleeve 52. In this way, the user's movement of the handle 70, upwardly or downwardly (i.e., as indicated by the arrows "$X_1$" and "$X_2$" respectively), causes the inlet sleeve 52 and the outlet sleeve 54 to move substantially simultaneously, and to substantially the same extent, to cooperate to at least partially define a predetermined path for the outlet part of the airflow through the cavity 32. The extent of the corresponding movement of the inlet and outlet sleeves is limited to being between the first and second inlet positions (i.e., for the inlet sleeve) and between the first and second outlet positions (i.e., for the outlet sleeve).

It will be understood that each of the inlet sleeve 52 and the outlet sleeve 54 is positionable in any position between the first and second inlet positions, and between the first and second outlet positions, respectively. As described above, the pivoting movement of each of the inlet sleeve 52 and the outlet sleeve 54 preferably is controlled by the connecting subassembly 46, so that the positions of the inlet sleeve 52 and the outlet sleeve 54 correspond to each other for directing the inlet part of the air flow toward the outlet sleeve 54.

As will be described, the handle 70 preferably is also pivotable about the pivot pin 72, in addition to being configured to transmit rotation about the outlet guide axis 50 to the knob element 60.

As can be seen in FIGS. 4B and 7-9, it is preferred that the second end 38 of the inlet guide 34 and the leading end 42 of the outlet guide 40 are positioned relatively close together and at least partially aligned. As described above, in one embodiment, due to the connecting subassembly 46, the movements of the inlet sleeve 52 and the outlet sleeve 54 (and the outlet barrels 56, mounted in the outlet sleeve 54) between the first and second inlet positions and the first and second outlet positions respectively are coordinated, so that a substantial portion of the inlet part of the air flow is directed by the inlet guide toward the outlet guide.

From the foregoing, it can be seen that the vent outlet assembly 20 provides directional control of the air flow with minimal turbulence. The pressure drop of the air flow through the vent outlet assembly 20 is minimized accordingly.

In one embodiment, the inlet sleeve 52 preferably defines an inlet channel 73 therein extending between the first and second ends 36, 38. As can be seen in FIGS. 7-9, the inlet channel 73 preferably is generally tapered from the first end to the second end, causing the inlet part of the air flow, which moves through the inlet channel 73, to accelerate toward the second end.

It is also preferred that the outlet barrel 56 extends between upstream and downstream ends 74, 76 (FIG. 8) relative to the direction of the air flow and includes a barrel cavity 78 therebetween that tapers toward the downstream end, to cause the outlet part of the air flow that flows through the barrel cavity 78 to accelerate toward the downstream end.

From the foregoing and FIGS. 7-9, it can be seen that the inlet channel 73 preferably is larger at the first end 36 than at the second end 38. Also, the barrel cavity 78 preferably is larger at the inner end 74 than at the outer end 76.

It is also preferred that the inlet channel 73 at the second end 38 has a diameter "$G_1$" that is substantially the same as a diameter "$G_2$" of the barrel cavity 78 at the inner end 74, as can be seen, for example, in FIG. 9.

In FIGS. 7-9, it can be seen that the net effect of the tapering of the inlet channel 73 and the barrel cavity 78 is to cause the parts of the air flow moving through the inlet and outlet guides to be accelerated somewhat.

As can be seen in FIG. 4B, in the outlet guide 40, there are gaps defined between the outlet barrels 56, through which a portion of the outlet part of the air flow is directed, as schematically indicated by arrow "M". Those skilled in the art would appreciate that the portion of the outlet part of the air flow schematically represented by arrow "M" is directed upwardly or downwardly or otherwise, as the case may be, by the outlet sleeve 54. Similarly, to an extent, the portion of the outlet part of the air flow exiting between the outlet barrels 56 is guided transversely by the exterior walls of the respective outlet barrels 56.

In use, when the vent outlet assembly 20 is installed in a suitable vent or passageway through which the air flow (e.g., heated, or cooled, or not) is directed, the user can easily control the direction of the air flow exiting the outlet assembly, via manipulation of the handle 70.

The vent outlet assembly 20 preferably is adapted to direct the air flow out of the housing upwardly, downwardly, or in a range of directions between the furthest upwardly and downwardly directions, which are illustrated in FIGS. 8 and 9 respectively. Preferably, the movement of the inlet and the outlet sleeves between the first and second inlet positions, and the first and second outlet positions, is controlled by the user, as described above.

For instance, as can be seen in FIG. 7, the inlet sleeve 52 is positionable at an intermediate position, generally midway between the first and second inlet positions. When the inlet sleeve 52 is in its intermediate position, the outlet sleeve 54 preferably is also in its intermediate position, i.e., generally midway between the first and second outlet guide positions. As shown in FIG. 7, when the inlet and outlet sleeves 52, 54 are in these intermediate positions, they are substantially aligned. The air flow entering the inlet end 24 is represented by arrow "A", and the resulting inlet part of the air flow through the inlet sleeve 52 is represented by arrow "$B_1$". The outlet part of the air flow through the outlet sleeve 54 is represented by the arrow "$C_1$" in FIG. 7, and the air flow exiting the housing 22 via the outlet end 26 is schematically represented by arrow "D". Those skilled in the art would appreciate that the air flow schematically represented by arrow "A" is substantially the same as the air flow schematically represented by arrow "D". A proportion of the air flow travels through the housing 22 outside of the inlet and outlet guides.

In FIG. 8, the inlet and outlet sleeves 52, 54 are shown in position to direct the outlet part of the air flow generally upwardly as it exits the outlet end 26 of the housing 22. The inlet sleeve 52 is shown in the first inlet guide position, and the outlet sleeve 54 is shown in the first outlet guide position, in FIG. 8. It can be seen in FIG. 8 that the inlet sleeve 52 and the outlet sleeve 54 are positioned to direct the outlet part of the air flow as far upwardly upon exit as possible, given the positions of the inlet and outlet sleeves 52, 54 inside the cavity 32 in the housing 22. The air flow into the inlet end 24 is represented by arrow "A". The inlet part of the air flow is directed by the inlet sleeve 52 in the direction indicated by arrow "$B_2$" (FIG. 8). The outlet part of the air flow is further directed by the outlet sleeve 54 upwardly, as represented by arrow "$C_2$". The air flow exiting the housing 22 via the outlet end 26 generally is schematically represented by arrow "D" in FIG. 8.

In FIG. 9, the inlet and outlet sleeves 52, 54 are shown positioned to direct the outlet part of the air flow exiting the outlet end 26 of the housing 22 generally downwardly. The inlet sleeve 52 is shown in the second inlet guide position, and the outlet sleeve 54 is shown in the second outlet guide position, in FIG. 9. It can be seen in FIG. 9 that the inlet sleeve 52 and the outlet sleeve 54 are positioned to direct the outlet part of the air flow as far downwardly upon exit as possible, given the positions of the inlet and outlet sleeves 52, 54 inside the cavity 32 in the housing 22. The air flow into the inlet end 24 of the housing 22 is represented by arrow "A". The inlet part of the air flow is directed by the inlet sleeve 52 in the direction indicated by arrow "$B_3$" (FIG. 9). The outlet part of the air flow is further directed by the outlet sleeve 54 downwardly, as represented by arrow "$C_3$". The air flow exiting the housing 22 via the outlet end 26 generally is schematically represented by arrow "D" in FIG. 9.

It is preferred that the outlet barrel is pivotable transversely relative to the direction of the inlet part of the air flow. In one embodiment, the outlet barrel 56 preferably is pivotable about a transverse outlet guide axis 80 that is substantially orthogonal to the outlet guide axis 50 between first and second transverse positions (FIGS. 4E, 4F), for directing the portion of the outlet part of the air flow (i.e., the portion that is channelled through the outlet barrels 56) in a selected transverse direction that is substantially orthogonal to the transverse outlet guide axis.

As noted above, in one embodiment, the outlet assembly 20 preferably includes a number of outlet barrels 56 (FIGS. 4A-4F). It is also preferred that the outlet barrels 56 are connected to each other by a linkage element 82 for substantially simultaneous movement of the outlet barrels 56 between the first and second transverse positions (FIGS. 4E, 4F).

Figure 4C:
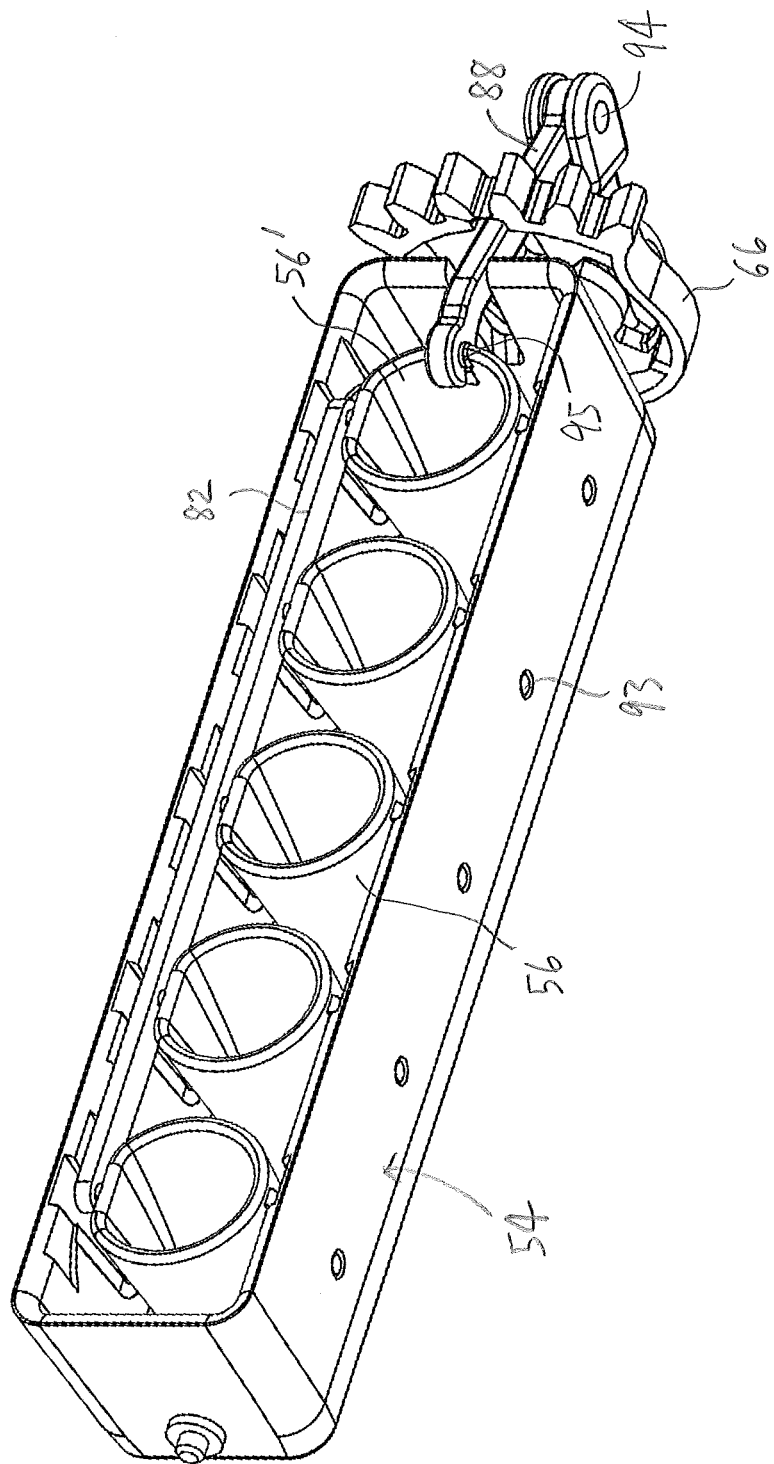
FIG. 4C is an isometric view of a portion of the vent outlet assembly of FIG. 4A, drawn at a larger scale.
Figure 4D:
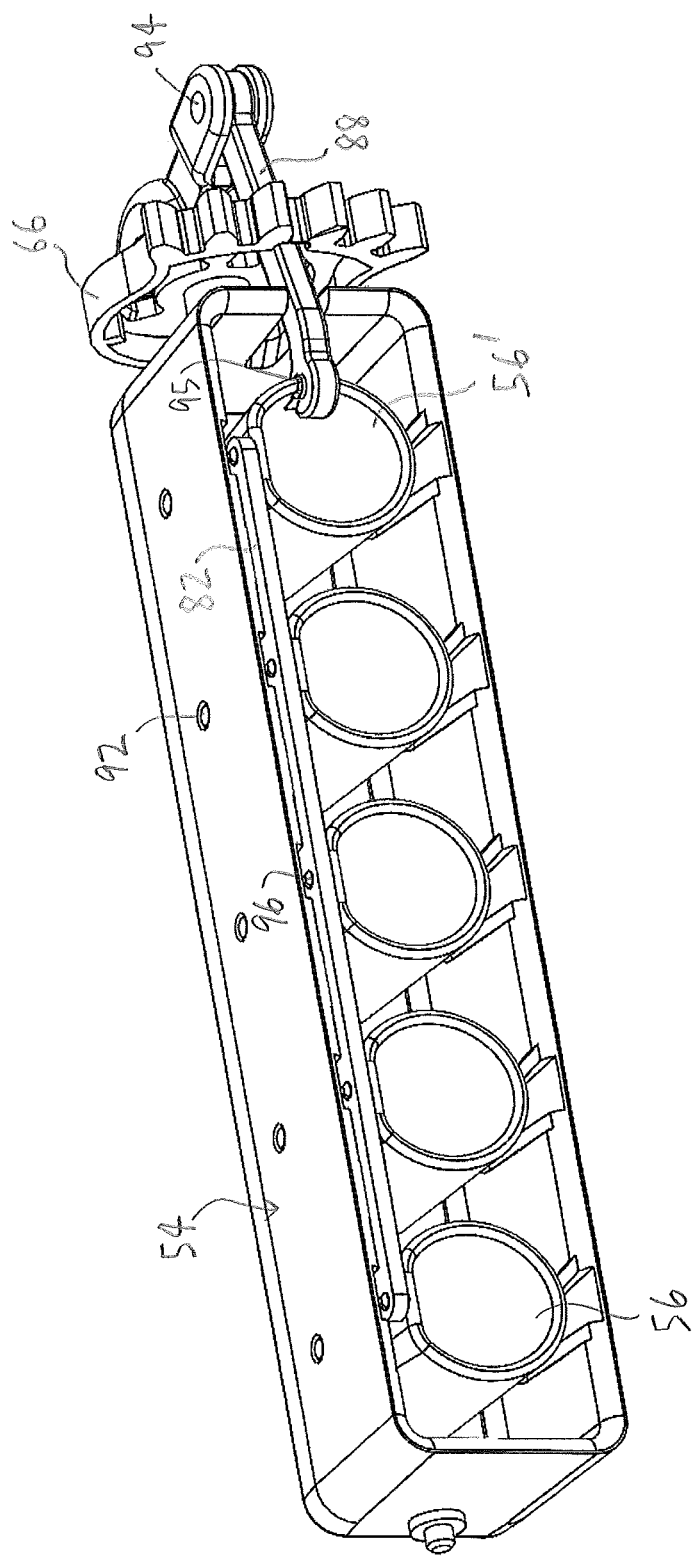
FIG. 4D is another isometric view of the portion of FIG. 4C.
Figure 4E:
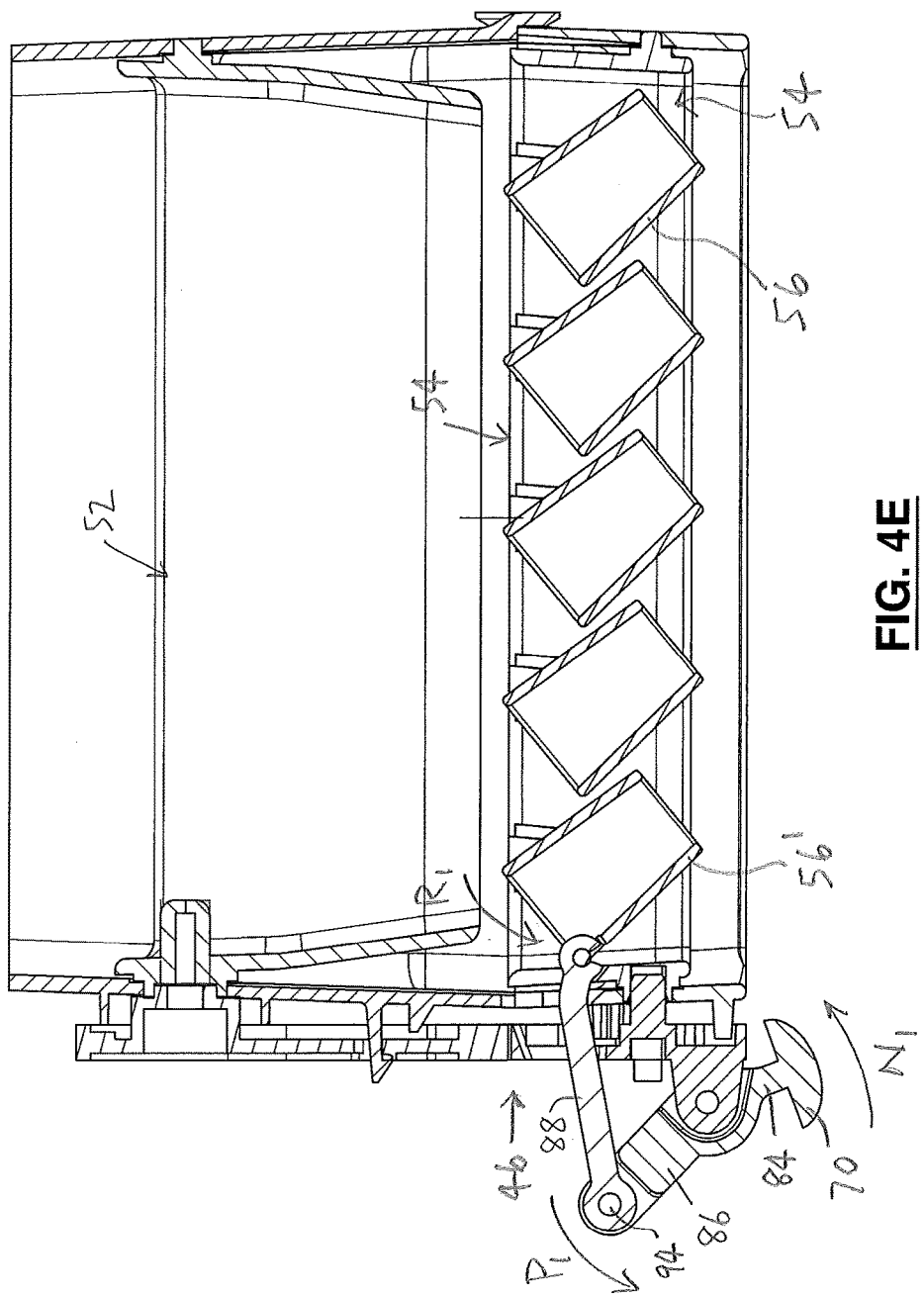
FIG. 4E is a cross-section of the vent outlet assembly of FIG. 4B in which each outlet barrel is positioned to direct the air flowing through it in a first transverse direction, drawn at a smaller scale.

As can be seen in FIGS. 4A and 4B, the handle 70 preferably includes a front portion 84 and a rear portion 86. The front portion 84 preferably is connected with the knob element 60 by the pivot pin 72 (FIG. 4A). It is preferred that the rear portion 86 is pivotably connected to a connecting element 88 that is also pivotably connected to a first outlet barrel 56' (FIGS. 4B-4D). As can be seen in FIGS. 4C and 4D, it is also preferred that each of the outlet barrels 56 is pivotably connected to each other sequentially by the linkage element 82.

Preferably, each outlet barrel 56 includes upper and lower pins 90, 91 that are mounted in respective recesses 92, 93 in the outlet sleeve 54 (FIG. 9). Each of the outlet barrels 56 is mounted in the outlet sleeve 54 for pivoting movement about the transverse outlet guide axis 80 therefor, as can be seen in FIGS. 7-9. The pins 90, 91 define the transverse outlet guide axis 80 for each outlet barrel 56 respectively.

From the foregoing, it can be seen that transverse pivoting of the outlet barrels 56 about their respective transverse outlet guide axes 80 may be initiated by movement of the handle 70. As can be seen in FIG. 4E, pivoting movement of the handle 70 in the direction indicated by arrow "$N_1$" causes the rear portion 86 of the handle 70 to move in the direction indicated by arrow "$P_1$", i.e., the handle 70 pivots about the pivot pin 72. This movement in turn causes the connecting element 88 also to move in the same direction as indicated by arrow "$P_1$", causing the first outlet barrel 56' to pivot about its axis 80 (not shown) toward the first transverse position thereof (FIG. 4E), i.e., in the direction indicated by arrow "$R_1$" in FIG. 4E. It will be understood that the pivoting movement of the first outlet barrel 56' causes corresponding pivoting movement of the other outlet barrels 56 about their respective axes 80, due to the connection of the outlet barrels 56 by the linkage element 82 (not shown in FIG. 4E).

Similarly, pivoting movement of the handle 70 in the direction indicated by arrow "$N_2$" causes the rear portion 86 of the handle 70 to move in the direction indicated by arrow "$P_2$" (FIG. 4F). This movement in turn causes the connecting element 88 also to move in the same direction as indicated by arrow "$P_2$", causing the first outlet barrel 56' to pivot about its axis 80 (not shown) toward the second transverse position thereof (FIG. 4F), i.e., in the direction indicated by arrow "$R_2$" in FIG. 4F. It will be understood that the pivoting movement of the first outlet barrel 56' causes corresponding pivoting movement of the other outlet barrels 56 about their respective axes 80, due to the linkage element 82 (not shown in FIG. 4F).

As can be seen in FIGS. 4E and 4F, the connecting arm 88 preferably is pivotably connected to the rear portion 86 of the handle 70 by a pin 94. Also, the connecting arm 88 preferably is pivotably connected to the first outlet barrel 56' at a bushing 95 mounted on the first outlet barrel 56' (FIGS. 4C, 4D). Preferably, and as can be seen in FIG. 4D, the linkage element 82 is pivotably connected with the first outlet barrel 56' and each of the other outlet barrels 56 at pins 96 on each.

Figure 10:
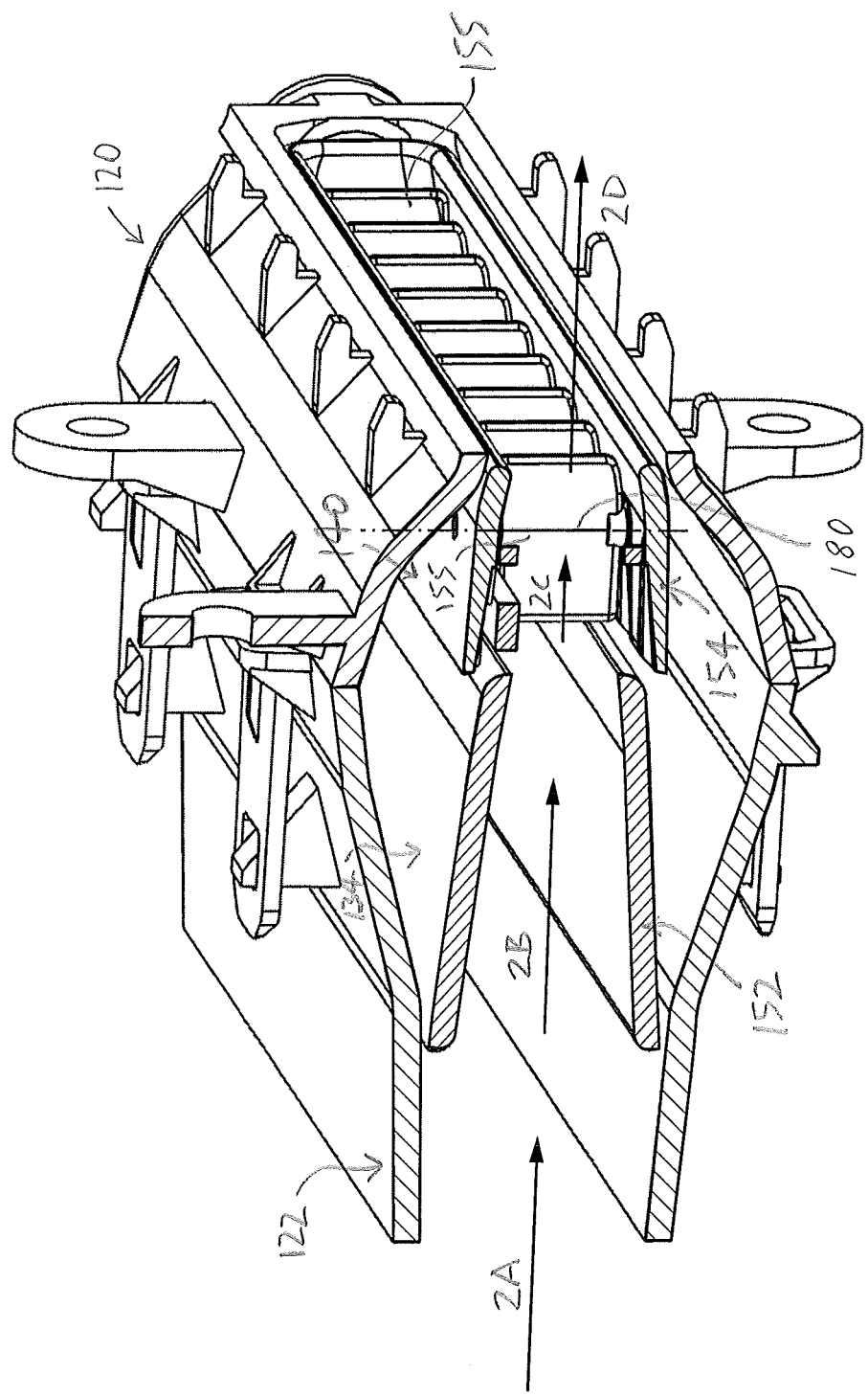
FIG. 10 is a partially cut-away isometric view of another embodiment of the vent outlet assembly.
Figure 11A:
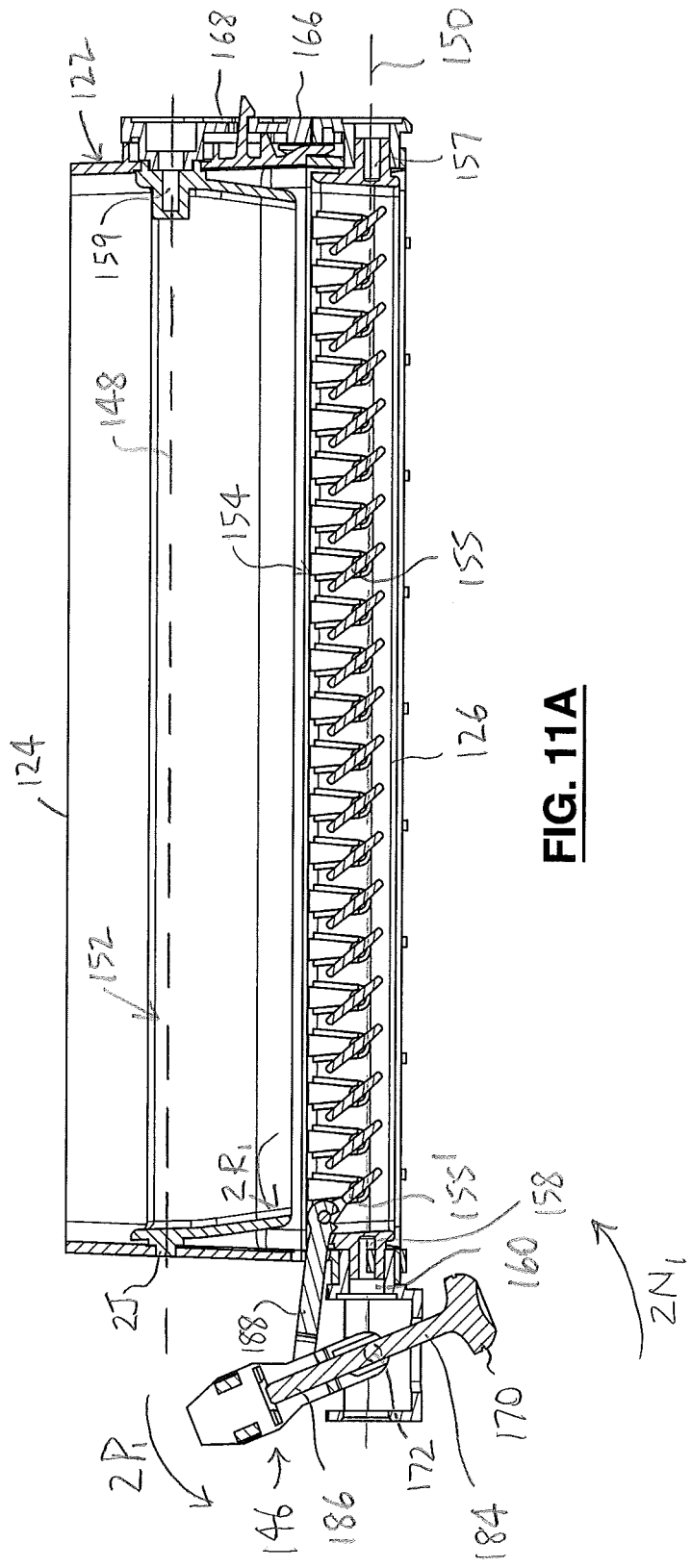
FIG. 11A is a cross-section of the vent outlet assembly of FIG. 10 in which the vanes are positioned to direct the air flowing past them in a first selected direction, drawn at a smaller scale.
Figure 11B:
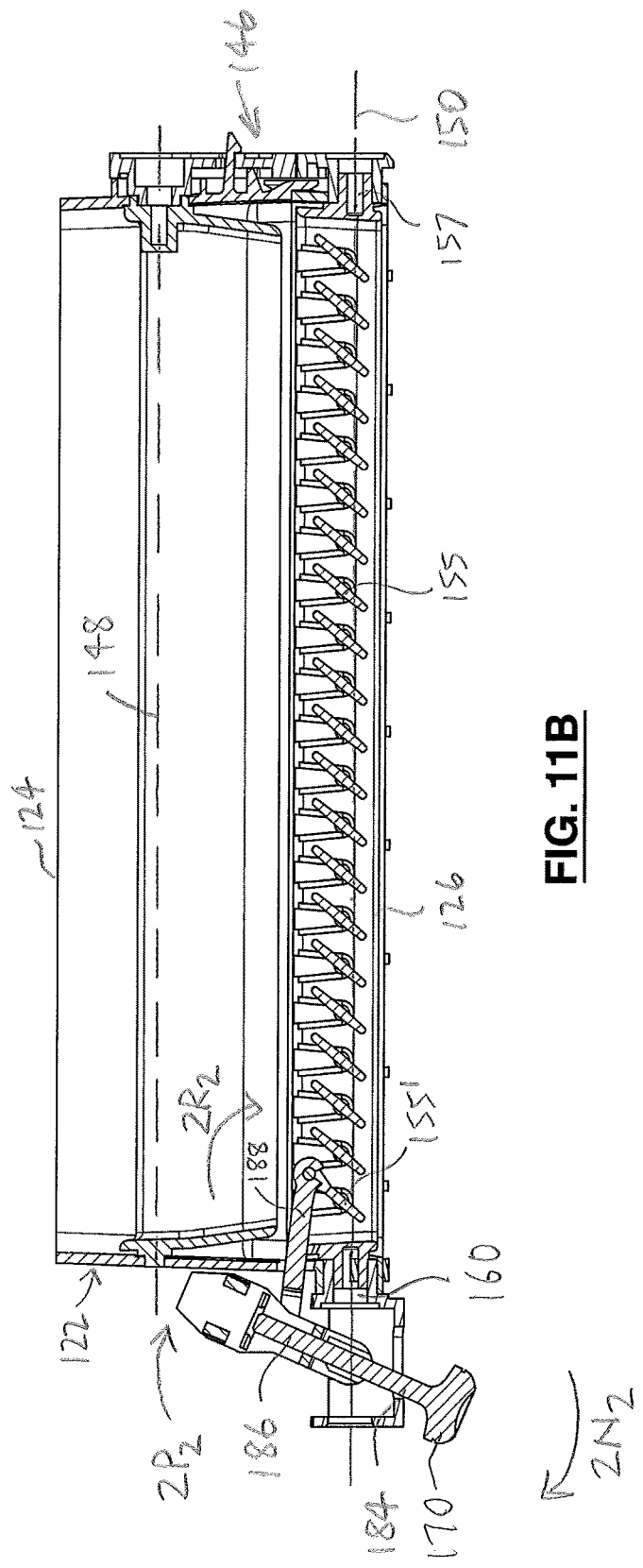
FIG. 11B is a cross-section of the vent outlet assembly of FIGS. 10 and 11A in which the vanes are positioned to direct the air flowing past them in a second selected direction.

An alternative embodiment of the vent outlet assembly 120 of the invention is illustrated in FIGS. 10-17. It is preferred that the vent outlet assembly 120 includes one or more outlet guides 140 (FIGS. 10-11B). Preferably, the outlet guide 140 includes one or more outlet sleeves 154 (FIG. 10), pivotable about an outlet guide axis 150 (FIGS. 11A, 11B). The outlet guide 140 preferably includes one or more vanes 155 for directing the outlet part of the air flow therethrough in one or more selected directions at least partially transverse to the outlet guide axis 150.

As can be seen in FIG. 10, the vent outlet assembly 120 preferably also includes an inlet guide 134 having an inlet sleeve 152. The inlet guide 134 and the outlet guide 140 preferably are mounted in a housing 122 of the vent outlet assembly 120 (FIG. 10). The housing 122 has an inlet end 124 and an outlet end 126 (FIG. 11A). It is also preferred that the inlet sleeve 152 is pivotable about an inlet guide axis 148 (FIGS. 11A, 11B). As will be described, the vent outlet assembly 120 preferably also includes a control subassembly 146, which connects the inlet sleeve 152 and the outlet sleeve 154. It will be understood that the pivoting movements of the inlet sleeve 152 about the inlet guide axis 148 and the outlet sleeve 154 about the outlet guide axis 150 are effected in a manner similar to that described above, with reference to the vent outlet assembly 20, and accordingly, further description of such pivoting movements is not required. In particular, it will be understood that the inlet sleeve 152 is pivotable between first and second inlet positions, and the outlet sleeve 154 is pivotable between first and second outlet positions, similar to the pivoting movements of the corresponding elements in the vent outlet assembly 20 described above.

The air flow into the vent outlet assembly 120 is schematically represented by arrow "2A", and an inlet part of the air flow through the inlet sleeve 152 is schematically represented by arrow "2B" (FIG. 10). An outlet part of the air flow is schematically represented by arrow "2C" in the outlet sleeve 154. In FIG. 10, the air flow exiting the housing 122 via the outlet end 124 is schematically represented by arrow "2D".

As can be seen in FIGS. 10-11B, the vanes 155 preferably are mounted for pivotal movement about a vane axis 180 substantially orthogonal to the outlet guide axis 150, to guide the outlet part of the air flow substantially transversely relative to the outlet guide axis 150.

From the foregoing, it can be seen that the outlet guide 140 does not include outlet barrels. Preferably, each of the vanes 155 includes one or more substantially planar surfaces 157, for directing the outlet part of the air flow substantially transversely relative to the vane axis 180.

As can be seen in FIGS. 11A and 11B, the control subassembly 146 is generally similar to the control subassembly 46 of the vent outlet assembly 20 of the invention first described above, except that the gears are mounted on a side of the housing opposite to the side to which the handle mechanism is located. Preferably, the control subassembly 146 includes a handle 170 that is pivotably mounted to an element 160 that is in turn secured to or includes an outlet projection 158 (FIG. 11A). The outlet projection 158 is rotatably mounted in the housing 122, and secured to the outlet sleeve 154. As a result, when the element 160 rotates, the outlet projection 158 and the outlet sleeve 154 rotate with it, and vice versa.

Figure 13:
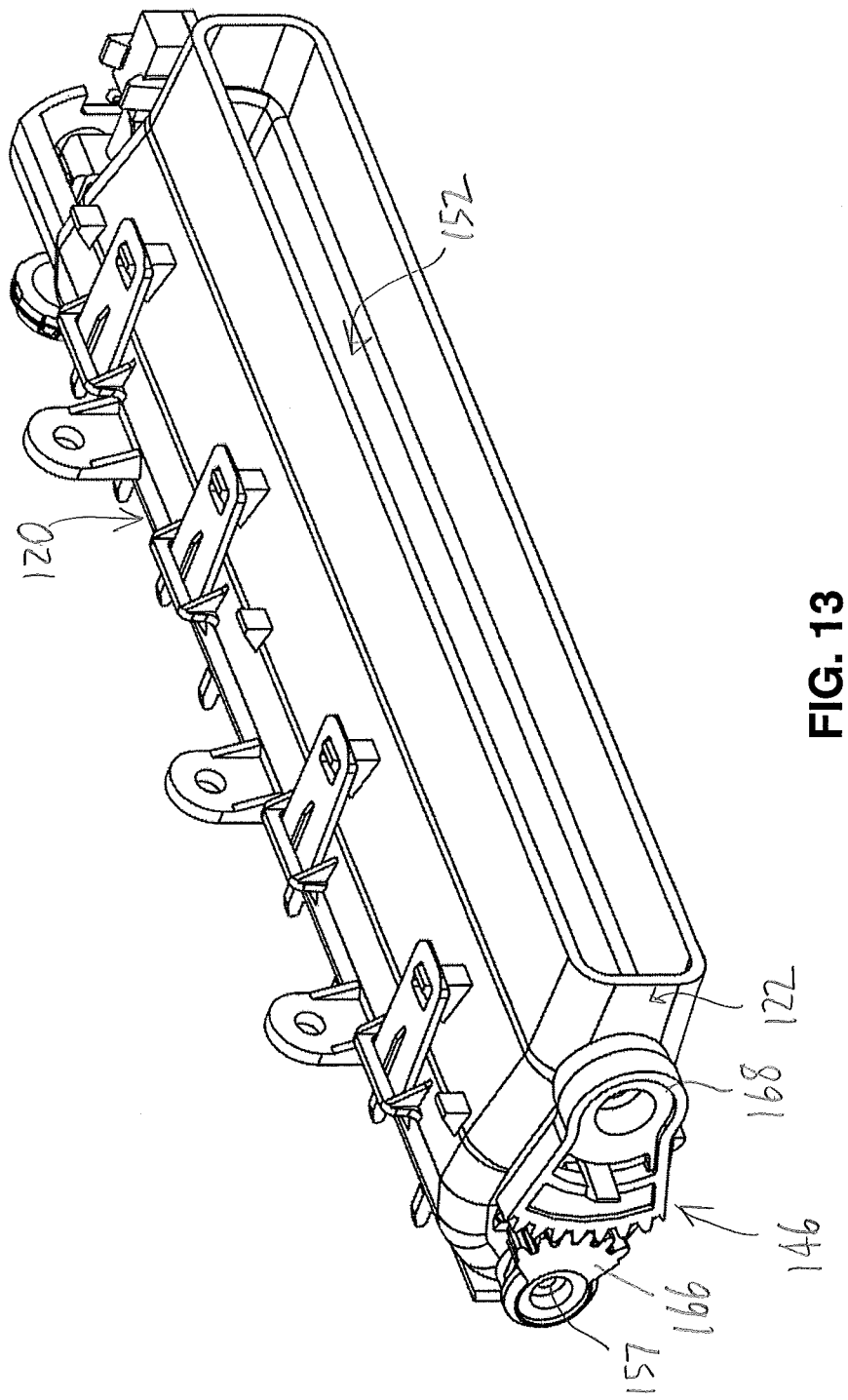
FIG. 13 is another isometric view of the inlet side of the vent outlet assembly of FIG. 12.

The control subassembly 146 preferably also includes a front axle stub 157 secured to the outlet sleeve 154 on a side opposite to that to which the outlet projection 158 is secured. The front axle stub 157 is rotatably mounted in the housing 122. The outlet guide axis 150 is defined by the outlet projection 158 and the front axle stub 157 (FIG. 11A). As can be seen in FIG. 13, the front axle stub 157 preferably extends beyond the housing 122. The control subassembly 146 preferably also includes a front gear 166 (FIG. 13) that is securely mounted to the front axle stub 157, to rotate therewith, as will also be described.

As can be seen in FIGS. 11A and 11B, the connecting subassembly 146 preferably includes a handle 170 connected to the element 160. The generally upwardly or downwardly pivoting movement of the handle 170 about the outlet guide axis 150 initiates pivoting movement of the outlet sleeve 154 about the outlet guide axis 150.

As can be seen in FIG. 11A, the inlet sleeve 152 preferably also includes a pin "2J" extending therefrom and rotatably mounted in the housing 122. Preferably, the control subassembly 146 also includes a rear axle stub 159 positioned opposite to the pin "2J", and secured to the inlet sleeve 152. The rear axle stub 159 extends through the housing 122 and is rotatable relative to the housing 122. As can be seen in FIG. 11A, the pin "2J" and the rear axle stub 159 define the inlet guide axis 148.

As can be seen in FIG. 13, the control subassembly 146 also preferably includes a rear gear 168 secured to the rear axle stub 159 and meshably engaged with the front gear 166.

From the foregoing, it can be seen that rotation of the outlet sleeve 154 about the outlet guide axis 150 may be initiated by pivoting movement of the handle 170 about the outlet guide axis 150. Also, due to the meshable engagement of the front and rear gears 166, 168, rotation of the outlet sleeve 154 about the outlet guide axis 150 causes rotation of the inlet sleeve 152 about the inlet guide axis 148, corresponding to the simultaneous rotation of the outlet sleeve 154. Because the elements used to effect corresponding movement of the inlet and outlet sleeves 152, 154 are virtually the same as the corresponding elements of the vent outlet assembly 20, further description of such elements in the vent outlet assembly 120 is unnecessary.

Figure 16:
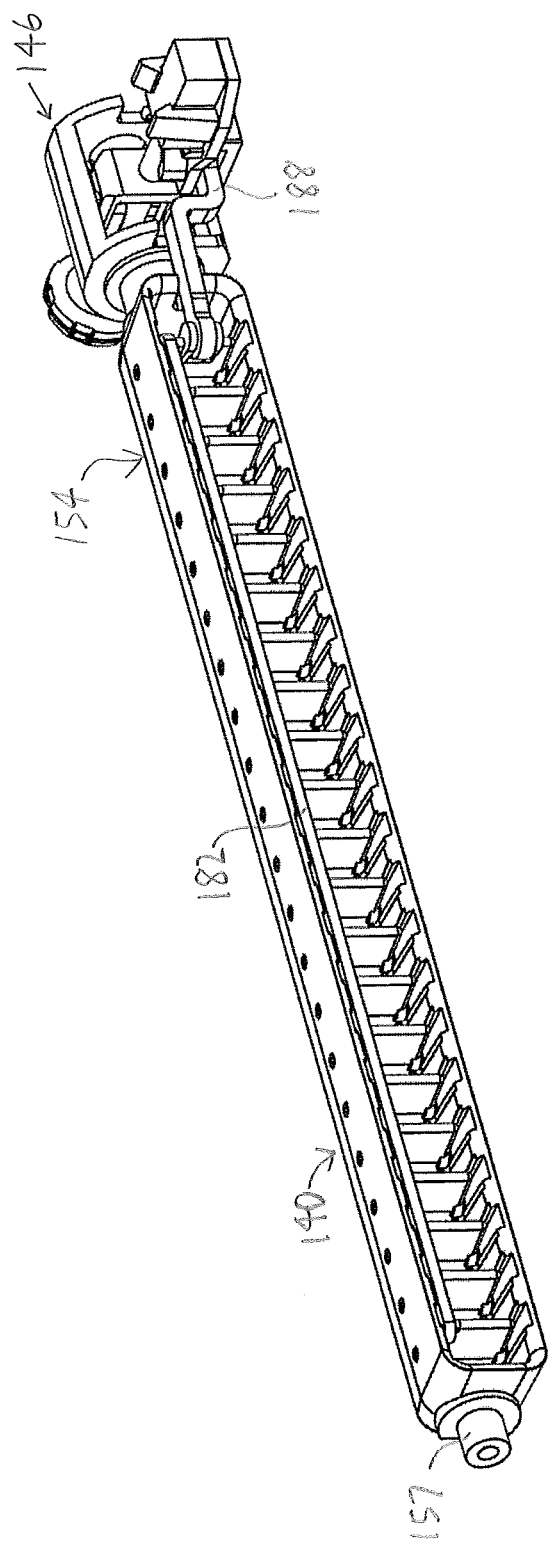
FIG. 16 is an isometric view of the outlet guide of the vent outlet assembly of FIGS. 10-15 showing a portion of the control subassembly thereof.
Figure 17:
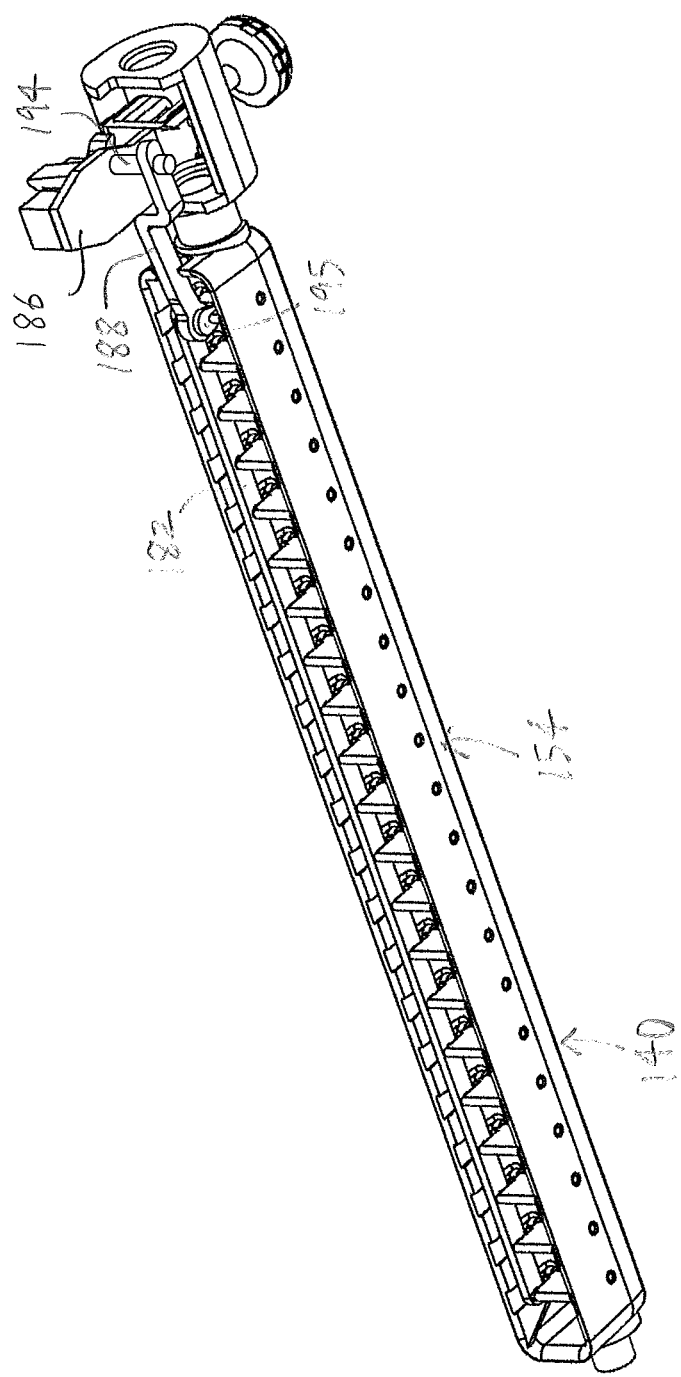
FIG. 17 is another isometric view of the outlet guide of the vent outlet assembly of FIGS. 10-14 illustrating another portion of the control subassembly thereof.

As can be seen in FIGS. 11A, 11B, and 17, the connecting subassembly 146 preferably also includes a connecting element 188 that is pivotably connected, at an outer end thereof, to the handle 170. The connecting element 188 is also pivotably connected, at an inner end thereof, to a first vane 155' (FIGS. 11A, 11B). The first vane 155' and the other vanes 155 preferably are linked together by a linkage element 182 (FIGS. 16 and 17). Due to the linkage of the first vane 155' and the other vanes 155 by the linkage element 182 (FIGS. 16 and 17), pivoting movement of the first vane 155' about its transverse axis 180 results in corresponding pivoting movement of the vanes 155 about their respective axes 180.

Preferably, the handle 170 is mounted to the element 160 by a pin 172 (indicated in dashed outline in FIG. 11A) that is positioned substantially orthogonal to the outlet guide axis 150. The handle 170 is pivotable about the pin 172 relative to the element 160. The handle 170 preferably includes a front portion 184 and a rear portion 186.

As can be seen in FIG. 17, the connecting arm 188 preferably is pivotably connected to the rear portion 186 of the handle 170 by a pin 194. Also, the connecting arm 188 preferably is pivotably connected to the first vane 155' at a bushing 195 mounted on the first vane 155' (FIG. 17). Preferably, and as can be seen in FIG. 17, the linkage element 182 is pivotably connected with the first vane 155' and each of the other vanes 155 at pins 196 on each.

From the foregoing, it can be seen that transverse pivoting of the vanes 155 about their respective transverse outlet guide axes 180 may be initiated by movement of the handle 170. As can be seen in FIG. 11A, pivoting movement of the handle 170 in the direction indicated by arrow "$2N_1$" causes the rear portion 186 of the handle 170 to move in the direction indicated by arrow "$2P_1$", i.e., the handle 170 pivots about the pivot pin 172. This movement in turn causes the connecting element 188 also to move in the same direction as indicated by arrow "$2P_1$", causing the first vane 155' to pivot about its axis 180 toward a first transverse position thereof (FIG. 11A), i.e., in the direction indicated by arrow "$2R_1$" in FIG. 11A. It will be understood that the pivoting movement of the first vane 155' causes corresponding pivoting movement of the other vanes 155 about their respective axes 180, due to the connection of the vanes 155 by the linkage element 182 (not shown in FIG. 11A).

Similarly, pivoting movement of the handle 170 in the direction indicated by arrow "$2N_2$" causes the rear portion 186 of the handle 170 to move in the direction indicated by arrow "$2P_2$" (FIG. 11B). This movement in turn causes the connecting element 188 also to move in the same direction as indicated by arrow "$2P_2$", causing the first vane 155' to pivot about its axis 180 (not shown) toward the second transverse position thereof (FIG. 11B), i.e., in the direction indicated by arrow "$2R_2$" in FIG. 11B. It will be understood that the pivoting movement of the first vane 155' causes corresponding pivoting movement of the other vanes 155 about their respective axes 180, due to the linkage element 182 (not shown in FIG. 11B).

Figure 12:
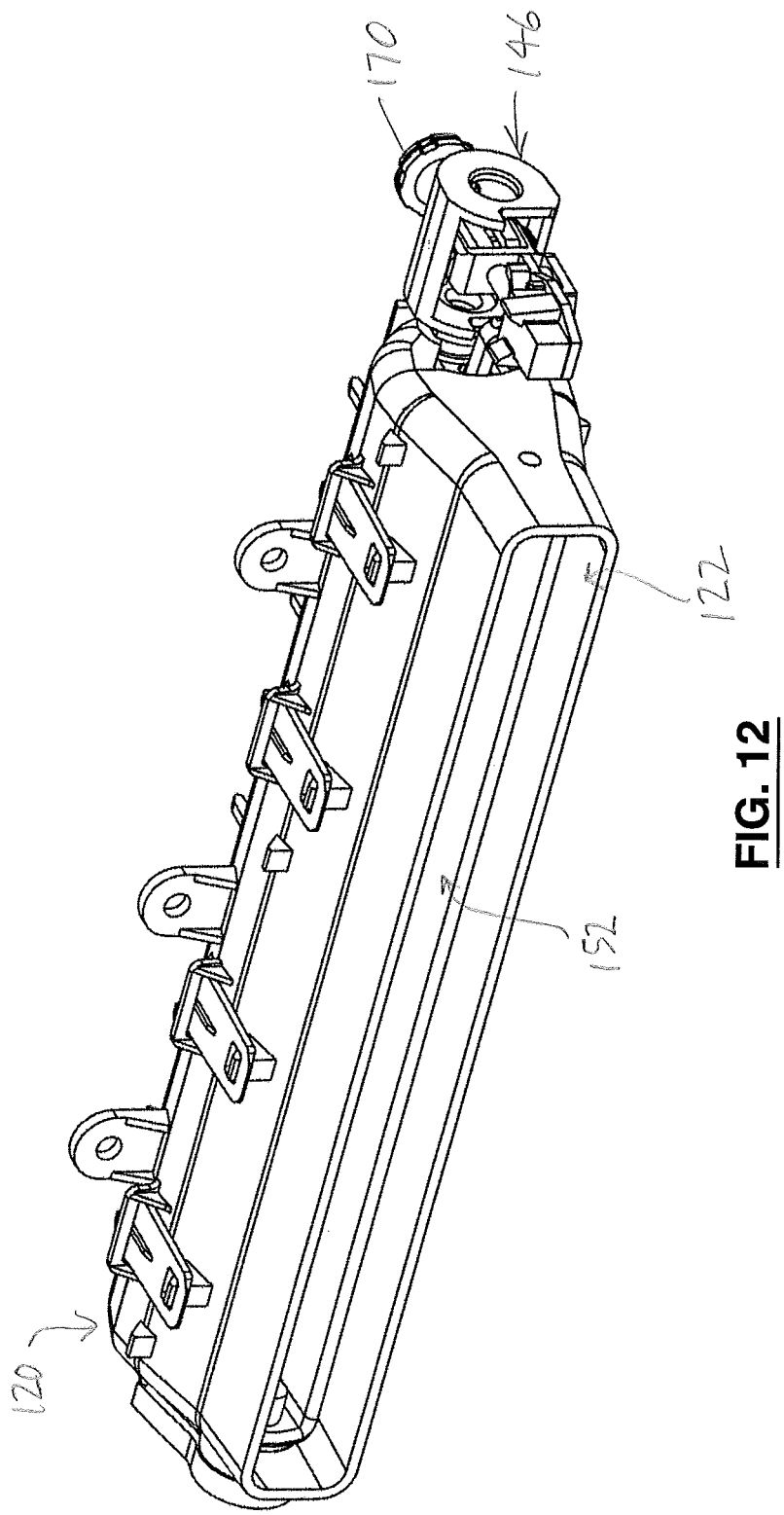
FIG. 12 is an isometric view of an inlet side of the vent outlet assembly of FIG. 10, drawn at a smaller scale.
Figure 14:
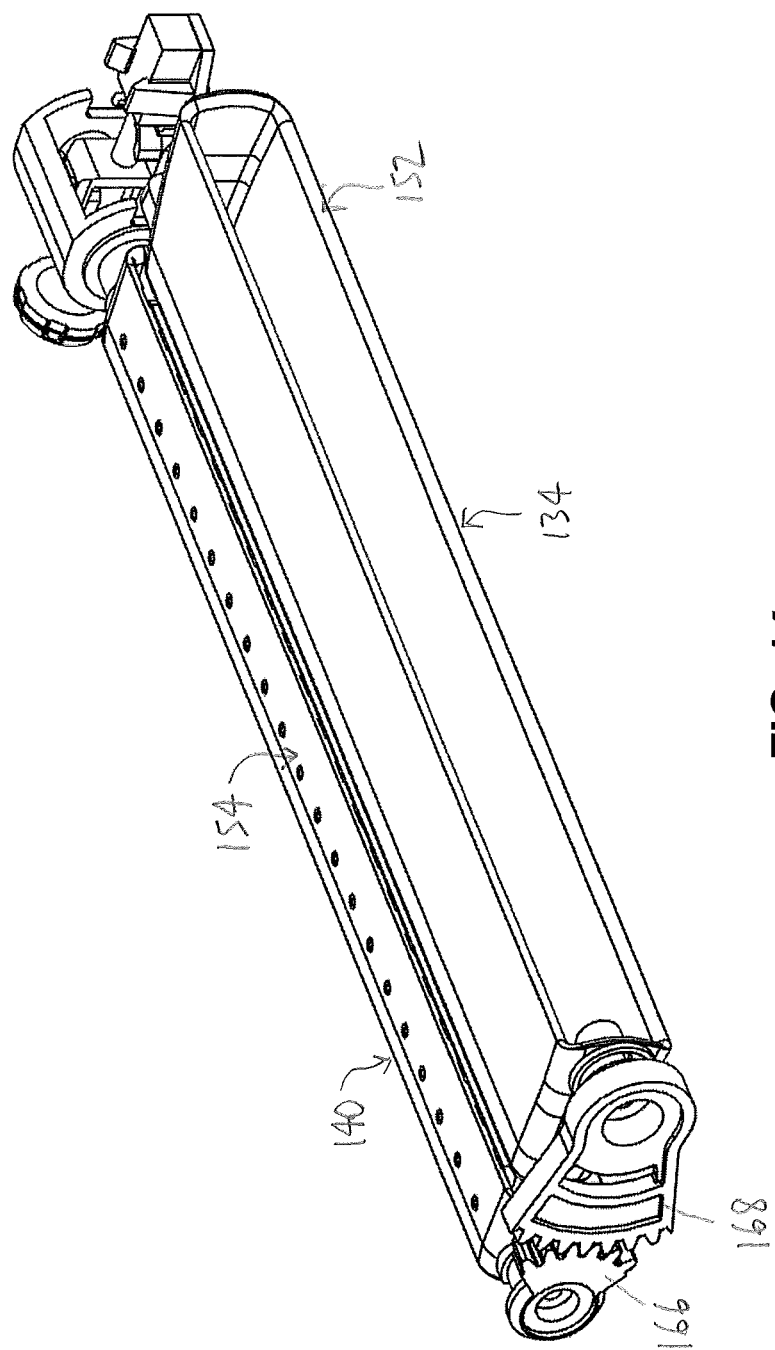
FIG. 14 is an isometric view of an inlet side of the inlet and outlet guides of the vent outlet assembly of FIGS. 10-13.
Figure 15:
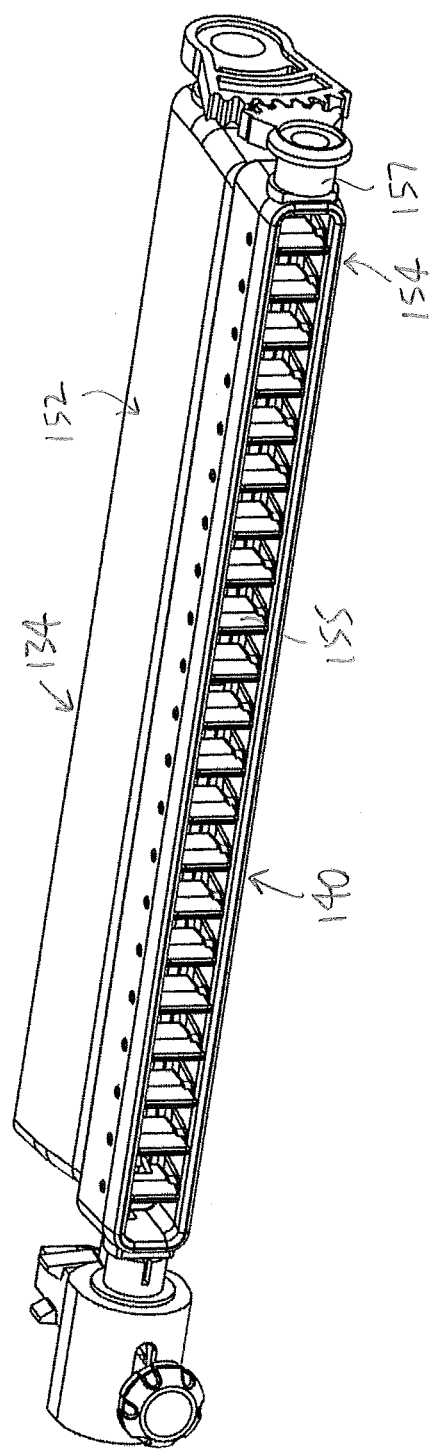
FIG. 15 is an isometric view of an outlet side of the inlet and outlet guides of FIG. 14.

In FIGS. 12 and 13, the vent outlet assembly 120 is illustrated, i.e., including the housing 122. In FIGS. 14 and 15, however, the housing 122 is omitted, for clarity of illustration. The positioning of the inlet and outlet sleeves 152, 154 relative to each other can be seen in FIGS. 14 and 15. In FIGS. 16 and 17, the outlet guide 140 is illustrated, with certain elements of the control subassembly 146, to show the relationship between such elements and certain elements of the outlet guide.

The air flow through the vent outlet assembly 120 is subjected to a minimal pressure drop.

Figure 18:
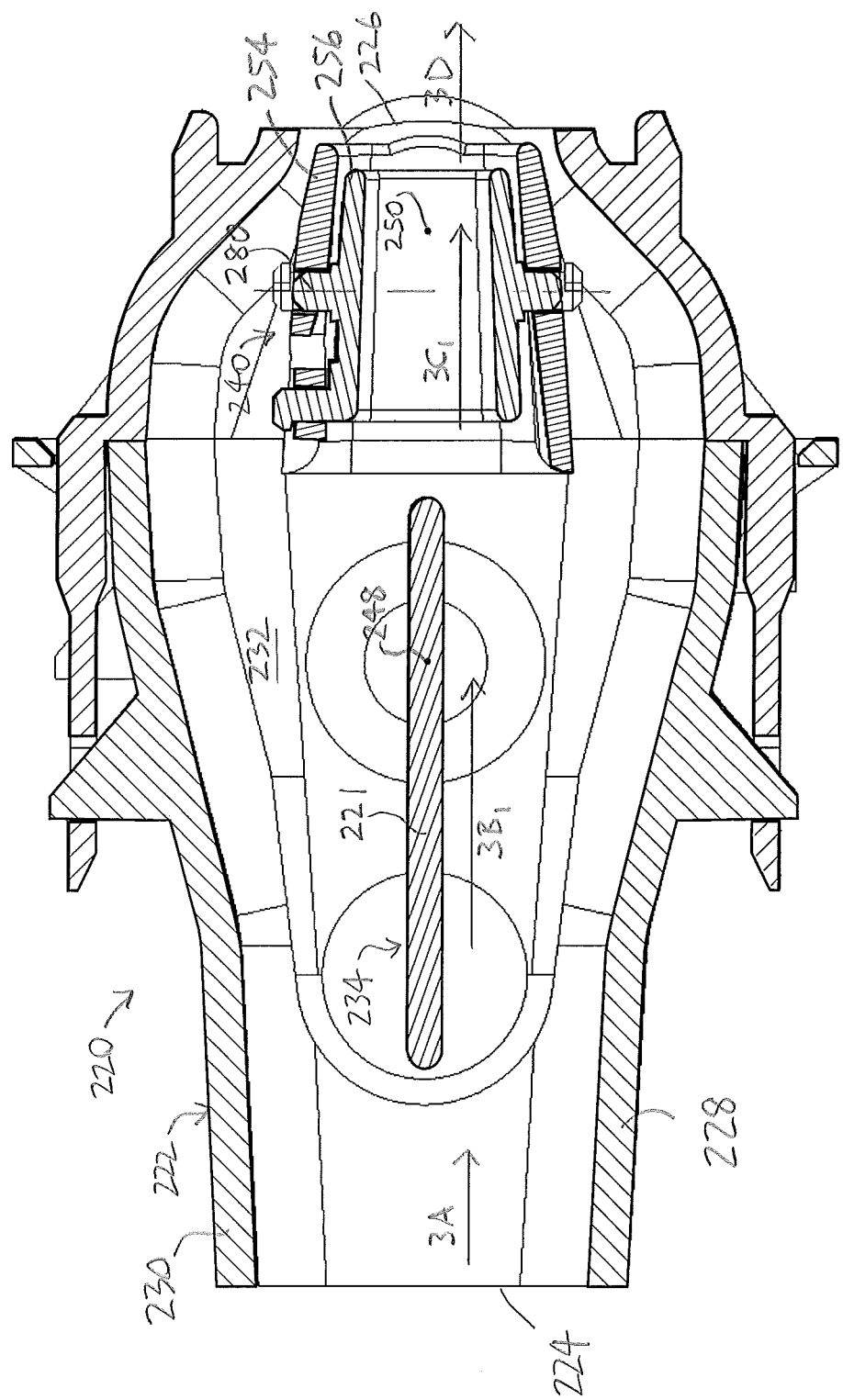
FIG. 18 is a cross-section of another embodiment of the vent outlet assembly of the invention in which the inlet and outlet guides are positioned in intermediate positions thereof, drawn at a larger scale.
Figure 19:
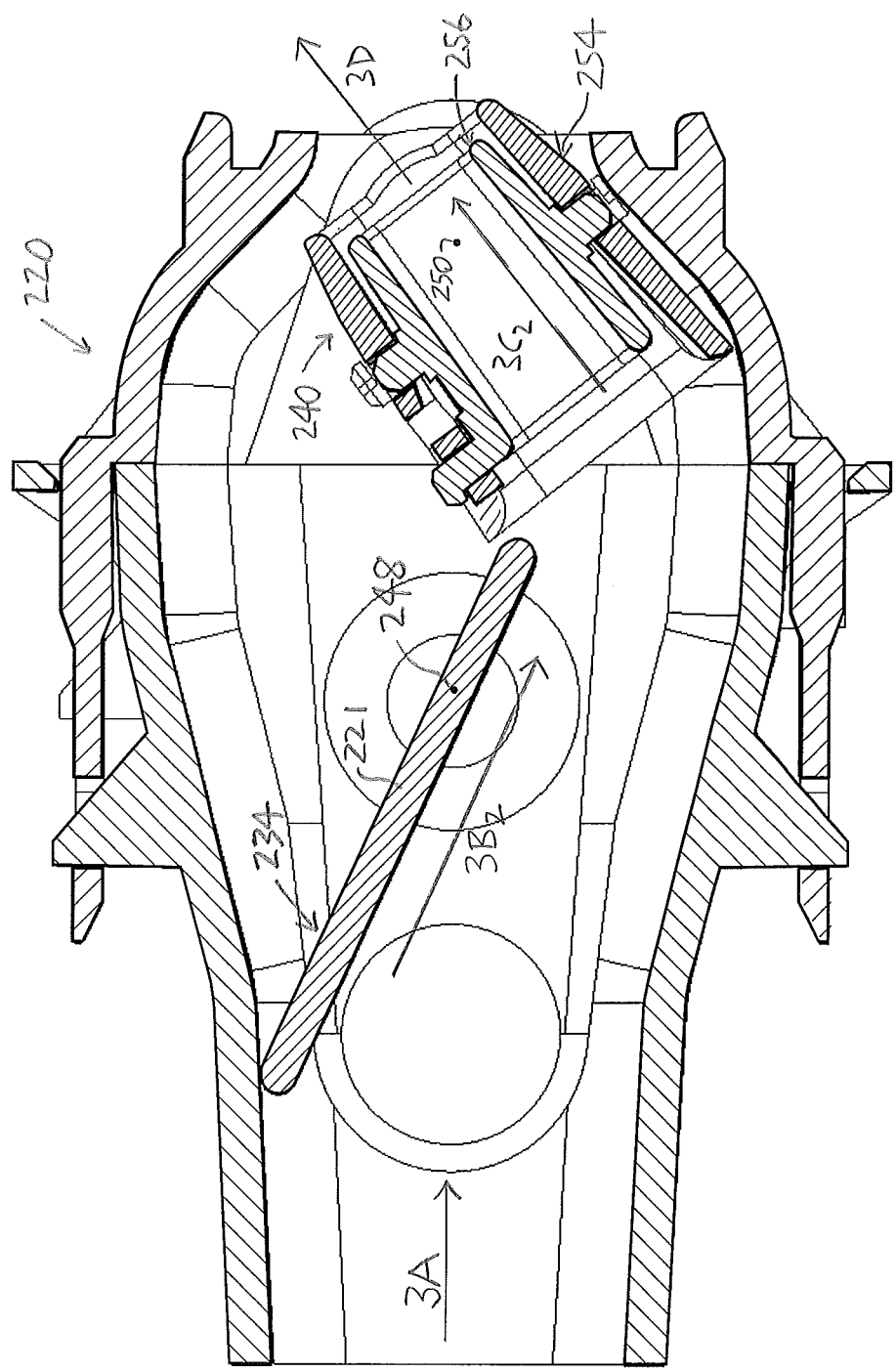
FIG. 19 is a cross-section of the vent outlet assembly of FIG. 18 in which the inlet and outlet guides are positioned in the first inlet and outlet positions respectively.
Figure 20:
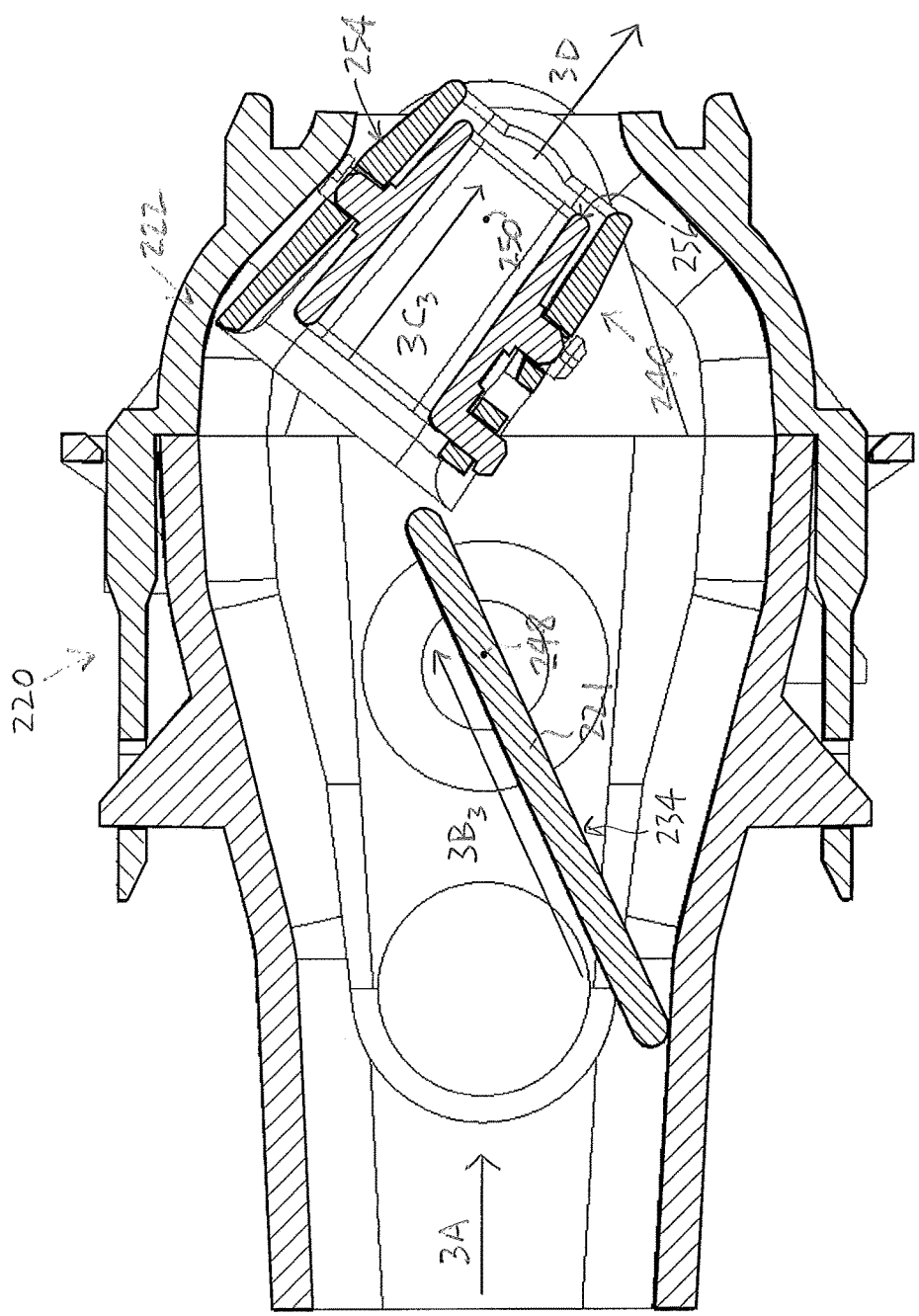
FIG. 20 is a cross-section of the vent outlet assembly of FIGS. 18 and 19 in which the inlet and outlet guides are positioned in the second inlet and outlet positions respectively.

Another alternative embodiment of the vent outlet assembly 220 is illustrated in FIGS. 18-20. As can be seen in FIGS. 18-20, the vent outlet assembly 220 preferably includes one or more inlet guides 234 and one or more outlet guides 240. Preferably, the inlet guide 234 includes an at least partially planar body 221 pivotable about an inlet guide axis 248, for directing the inlet part of the air flow toward the outlet guide 240. It is also preferred that the outlet guide 240 is pivotable about an outlet guide axis 250.

As can also be seen in FIGS. 18-20, the inlet guide 234 preferably is pivotable between first and second inlet positions, as illustrated in FIGS. 19 and 20 respectively. Also, the outlet guide 240 is pivotable between first and second outlet positions, as illustrated in FIGS. 19 and 20 respectively. The inlet and outlet guides preferably are each positionable at any position between the first and second inlet positions, and between the first and second outlet positions, respectively. For instance, in FIG. 18, the inlet and outlet guides 234, 240 are each shown in intermediate positions thereof.

The vent outlet assembly 220 preferably includes a housing 222 extending between inlet and outlet ends thereof 224, 226. The housing 222 includes lower and upper walls 228, 230 at least partially defining a cavity 232 therein, in which the inlet and outlet guides 234, 240 are positioned (FIG. 18).

In one embodiment, the outlet guide 240 preferably includes one or more outlet barrels 256 mounted inside the outlet sleeve 254. Preferably, each of the outlet barrels 256 is pivotable transversely, about a transverse axis 280 (FIG. 18). The manner in which the outlet barrels 256 are mounted in the outlet sleeve 254 preferably is the same as that described above in connection with the vent outlet assembly 20, and further description thereof is therefore not necessary.

It will also be understood that the pivoting movements of the inlet guide 234 about the inlet guide axis 248, and of the outlet guide 240 about the outlet guide axis 250, are coordinated by a connecting subassembly (not shown in FIGS. 18-20) that causes the inlet guide 234 and the outlet guide 240 to move together as they pivot about the inlet and outlet guide axes 248, 250. The connecting subassembly preferably is substantially the same as one of the connecting subassemblies 46, 146 described above, and accordingly further description of the connecting subassembly is unnecessary.

The vent outlet assembly 220 preferably is adapted to direct the air flow out of the housing upwardly, downwardly, or in a range of directions between the furthest upwardly and downwardly directions, which are illustrated in FIGS. 19 and 20 respectively. Preferably, the movement of the inlet guide 234 and the outlet guide 240 between the first and second inlet positions and the first and second outlet positions respectively is controlled by the user via the control subassembly, as described above.

For instance, as can be seen in FIG. 18, the inlet guide 234 is positionable at an intermediate position, generally midway between the first and second inlet positions. When the inlet guide 234 is in its intermediate position, the outlet guide 240 preferably is also in its intermediate position, i.e., generally midway between the first and second outlet guide positions, due to the connection of the inlet and outlet guides 234, 240 via the connecting subassembly (not shown in FIGS. 18-20). As shown in FIG. 18, when the inlet and outlet guides 234, 240 are in their intermediate positions, they are substantially aligned. In FIG. 18, the air flow entering the inlet end 224 is represented by arrow "3A", and an inlet part of the air flow past the inlet guide 234 is represented by arrow "$3B_1$". The inlet part of the air flow is directed toward the outlet guide 240 by the inlet guide 234. An outlet part of the air flow (being a portion of the inlet part) flows through the outlet guide 240. The outlet part of the air flow flowing through the outlet guide 240 is represented by the arrow "$3C_1$" in FIG. 18, and the air flow exiting the housing 222 via the outlet end 226 is schematically represented by arrow "3D". Those skilled in the art would appreciate that the air flow schematically represented by arrow "3A" is substantially the same as the air flow schematically represented by arrow "3D", and that a proportion of the air flow travels through the cavity 232 outside of the outlet guide 240.

In FIG. 19, the inlet and outlet guides 234, 240 are shown in position to direct the outlet part of the air flow generally upwardly as it exits the outlet end 226 of the housing 222. The inlet guide 234 is shown in the first inlet position, and the outlet sleeve 254 is shown in the first outlet position, in FIG. 19. It can be seen in FIG. 19 that the inlet guide 234 and the outlet sleeve 254 are positioned to direct the outlet part of the air flow as far upwardly upon exit as possible, given the positions of the inlet guide 234 and outlet sleeve 254 inside the cavity 232 in the housing 222. The air flow into the inlet end 224 is represented by arrow "3A". The inlet part of the air flow is directed by the inlet guide 234 in the direction indicated by arrow "$3B_2$" (FIG. 19). The inlet part of the air flow is directed toward the outlet guide 240. It will be appreciated by those skilled in the art that, when the inlet and outlet guides 234, 240 are positioned as illustrated in FIG. 19, only a portion of the inlet part of the air flow is directed through the outlet guide 240. The outlet part of the air flow is further directed by the outlet sleeve 254 upwardly, as represented in FIG. 19 by arrow "$3C_2$". The air flow exiting the housing 222 via the outlet end 226 generally is schematically represented by arrow "3D" in FIG. 19.

In FIG. 20, the inlet guide 234 and the outlet sleeve 254 are shown positioned to direct the outlet part of the air flow exiting the outlet end 226 of the housing 222 generally downwardly. The inlet guide 234 is shown in the second inlet guide position, and the outlet sleeve 254 is shown in the second outlet guide position, in FIG. 20. It can be seen in FIG. 20 that the inlet guide 234 and the outlet sleeve 254 are positioned to direct the outlet part of the air flow as far downwardly upon exit as possible, given the positions of the inlet guide 234 and the outlet sleeve 254 inside the cavity 232 in the housing 222. The air flow into the inlet end 224 of the housing 222 is represented by arrow "3A". The inlet part of the air flow is directed by the inlet guide 234 in the direction indicated by arrow "$3B_3$", toward the outlet guide 240 (FIG. 20). It will be appreciated by those skilled in the art that, when the inlet and outlet guides 234, 240 are positioned as illustrated in FIG. 20, only a portion of the inlet part of the air flow is directed through the outlet guide 240. The outlet part of the air flow is further directed by the outlet sleeve 254 downwardly, as represented by arrow "$3C_3$". The air flow exiting the housing 222 via the outlet end 226 generally is schematically represented by arrow "3D" in FIG. 20.

It is believed that, because the inlet guide 234 includes the blade or planar body 221 rather than an inlet barrel, the pressure drop to which the air flow is subjected in the vent outlet assembly 220 is less than in the vent outlet assemblies 20, 120. Also, it will be understood that the outlet guide 240 may include means (not shown in FIGS. 18-20) for transversely directing the outlet part of the air flow, e.g., such as the means therefor described above.

Figure 21:
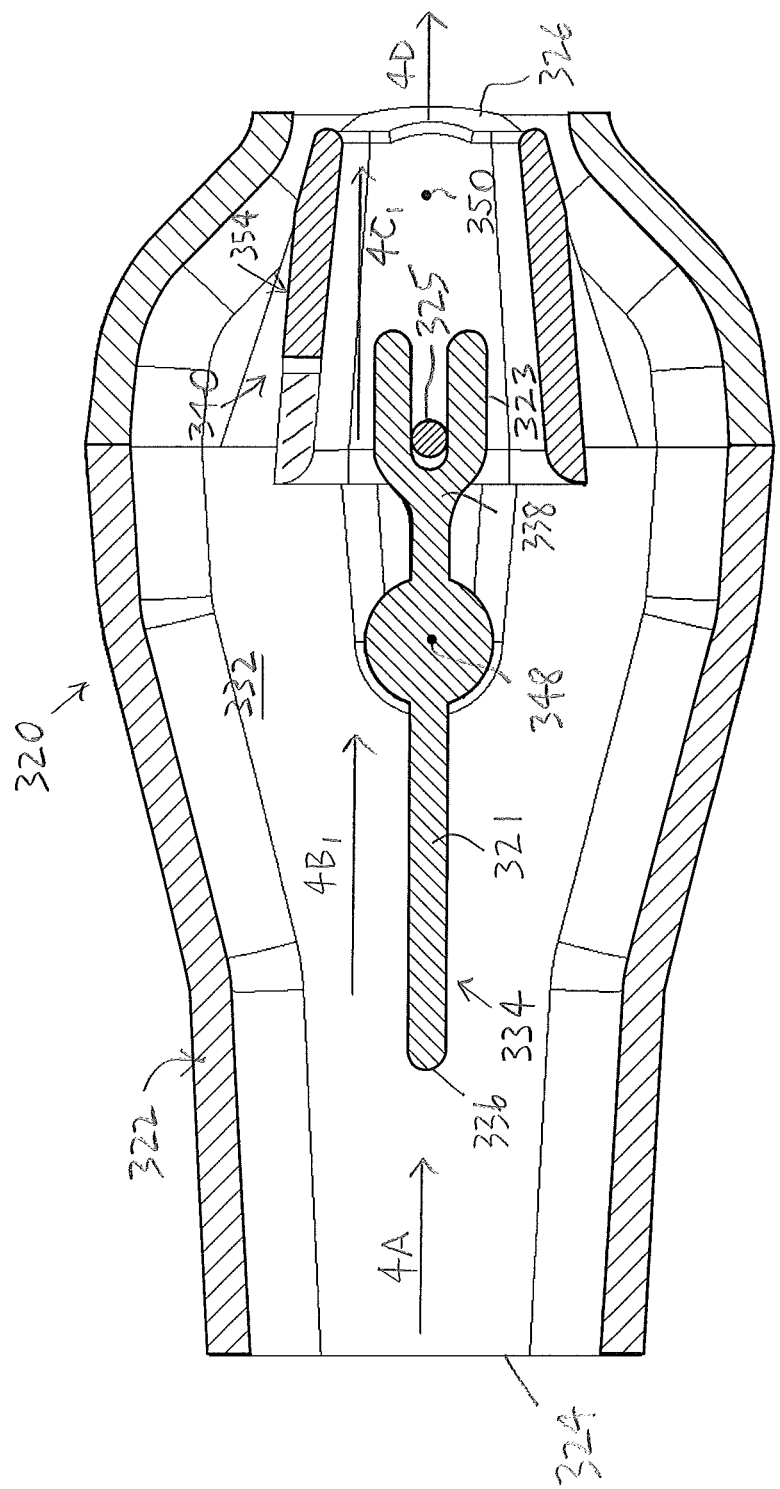
FIG. 21 is a cross-section of another embodiment of the vent outlet assembly of the invention in which the inlet and outlet guides are positioned in the first inlet and outlet positions respectively.
Figure 22:
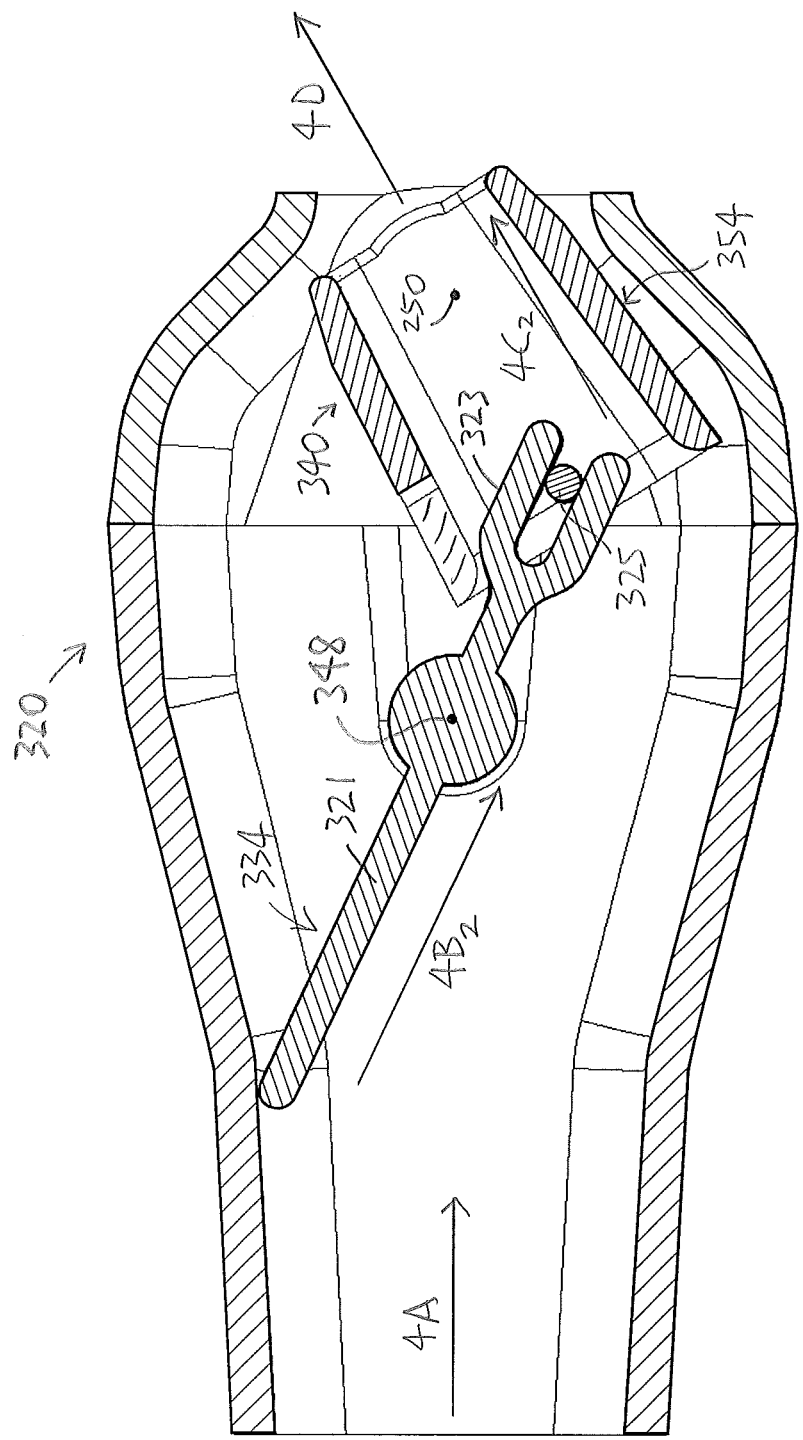
FIG. 22 is a cross-section of the vent outlet assembly of FIG. 21 in which the inlet and outlet guides are positioned in intermediate positions thereof.
Figure 23:
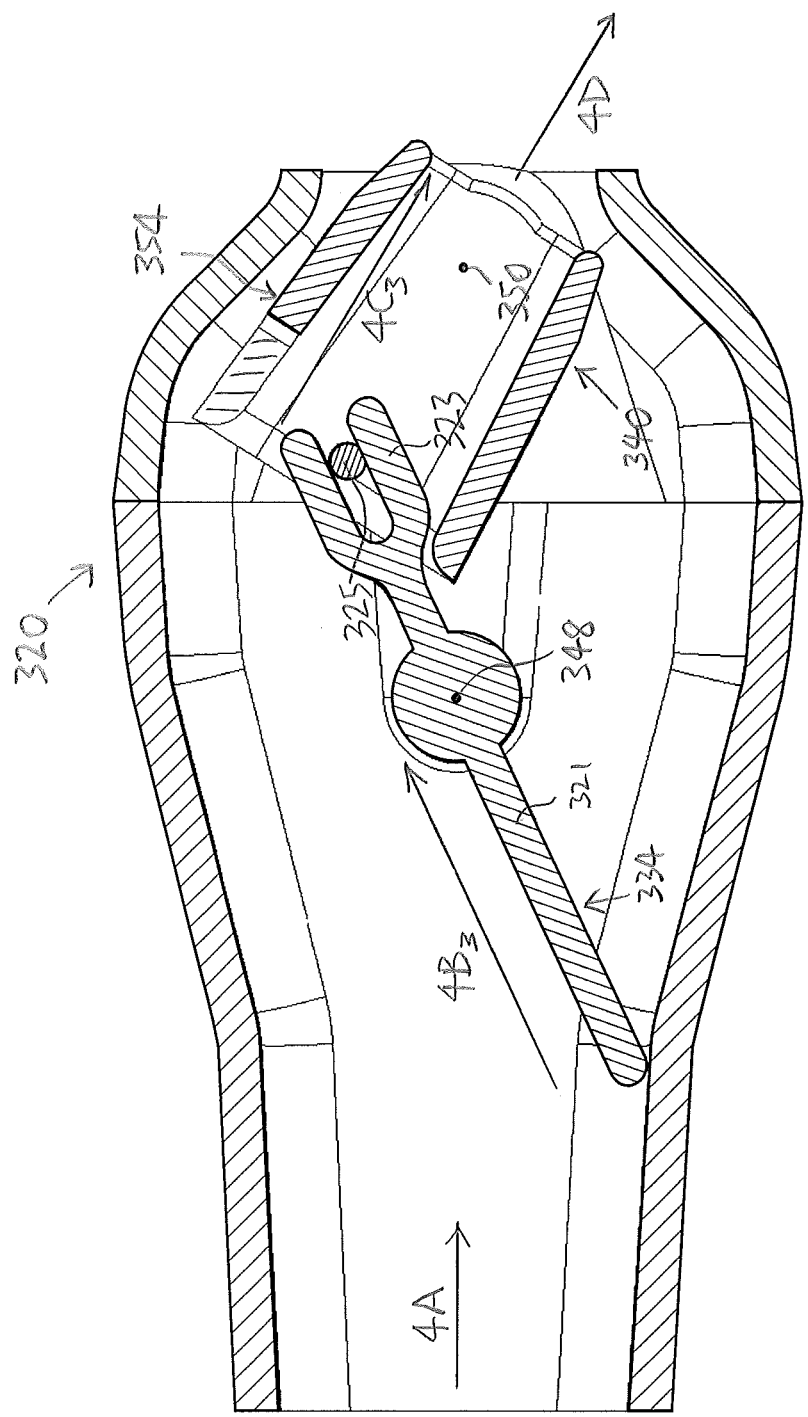
FIG. 23 is a cross-section of the vent outlet assembly of FIGS. 21 and 22 in which the inlet and outlet guides are positioned in the second inlet and outlet positions respectively.

Another alternative embodiment of the vent outlet assembly 320 is illustrated in FIGS. 21-23. As can be seen in FIGS. 21-23, the vent outlet assembly 320 preferably includes one or more inlet guides 334 and one or more outlet guides 340. Preferably, the inlet guide 334 includes an at least partially planar body 321 pivotable about an inlet guide axis 348, for directing the inlet part of the air flow toward the outlet guide 340. It is also preferred that the outlet guide 340 is pivotable about an outlet guide axis 350.

Preferably, the inlet guide 334 extends between upstream and downstream ends 336, 338 thereof relative to the air flow. It is also preferred that the inlet guide includes a fork 323 mounted at the downstream end 338, and the outlet guide 340 includes a pin 325 slidingly receivable in the fork 323 (FIG. 21). The fork 323 engages the pin 325 for corresponding movement of the outlet guide 340 between the first and second outlet positions thereof as the inlet guide 334 is moved between the first and second inlet positions thereof respectively.

As can also be seen in FIGS. 21-23, the inlet guide 334 preferably is pivotable between first and second inlet positions, as illustrated in FIGS. 22 and 23 respectively. Also, the outlet guide 340 is pivotable between first and second outlet positions, as illustrated in FIGS. 22 and 23 respectively. The inlet and outlet guides preferably are each positionable at any position between the first and second inlet positions, and between the first and second outlet positions, respectively. For instance, in FIG. 21, the inlet and outlet guides 334, 340 are each shown in intermediate positions thereof.

The vent outlet assembly 320 preferably includes a housing 322 extending between inlet and outlet ends 324, 326 thereof. The housing 322 includes lower and upper walls 328, 330 at least partially defining a cavity 332 therein, in which the inlet and outlet guides 334, 340 are positioned.

As can be seen in FIGS. 21-23, in one embodiment, the outlet guide 340 preferably includes an outlet sleeve 354, which is pivotable about the outlet guide axis 350 between the first and second outlet positions. In FIGS. 21-23, the outlet guide 340 is not shown as including one or more vanes, for guiding an outlet part of the air flow transversely, for clarity of illustration. Those skilled in the art would appreciate that the outlet guide 340 may include one or more vanes, or other means for transversely directing the outlet part of the air flow.

It will also be understood that the pivoting movement of the inlet guide 334 about the inlet guide axis 348 is initiated by the user external to the housing 322. For example, a handle (not shown) may enable the user to initiate rotation of the inlet guide 234 about the inlet guide axis 248. However, as can be seen in FIGS. 21-23, due to the engagement of the fork 323 with the pin 325, rotation of the inlet guide 334 about the inlet guide axis 348 directly results in rotation of the outlet guide 340 about the outlet guide axis 350. For example, rotation of the inlet guide 334 about the inlet guide axis 348 in the direction indicated by arrow "$S_1$" results in corresponding rotation of the outlet guide 340 in the direction indicated by arrow "$T_1$" (FIG. 22), until the inlet and outlet guides 334, 340 are in the first inlet and outlet positions respectively.

Similarly, rotation of the inlet guide 334 about the inlet guide axis 348 in the direction indicated by arrow "$S_2$" results in corresponding rotation of the outlet guide 340 in the direction indicated by arrow "$T_2$" (FIG. 23), until the inlet and outlet guides 334, 340 are in the second inlet and outlet positions respectively.

The vent outlet assembly 320 preferably is adapted to direct the air flow out of the housing upwardly, downwardly, or in a range of directions between the furthest upwardly and downwardly directions, which are illustrated in FIGS. 22 and 23 respectively. Preferably, the movement of the inlet guide 334 and the outlet guide 340 between the first and second inlet positions and the first and second outlet positions respectively is controlled by the user via the control subassembly, as described above.

For instance, as can be seen in FIG. 21, the inlet guide 334 is positionable at an intermediate position, generally midway between the first and second inlet positions. When the inlet guide 334 is in its intermediate position, the outlet guide 340 preferably is also in its intermediate position, i.e., generally midway between the first and second outlet guide positions, due to the connection of the inlet and outlet guides 334, 340 via the fork 323 and the pin 325. As shown in FIG. 21, when the inlet and outlet guides 334, 340 are in their intermediate positions, they are substantially aligned. In FIG. 21, the air flow entering the inlet end 324 is represented by arrow "4A", and an inlet part of the air flow past the inlet guide 334 is represented by arrow "$4B_1$". The inlet part of the air flow is directed toward the outlet guide 340 by the inlet guide 334. The outlet part of the air flow (being a portion of the inlet part) flows through the outlet guide 340. The outlet part of the air flow flowing through the outlet guide 340 is represented by the arrow "$4C_1$" in FIG. 21, and the air flow exiting the housing 322 via the outlet end 326 is schematically represented by arrow "4D". Those skilled in the art would appreciate that the air flow schematically represented by arrow "4A" is substantially the same as the air flow schematically represented by arrow "4D", and that a proportion of the air flow travels through the cavity 332 outside of the outlet guide 340.

In FIG. 22, the inlet and outlet guides 334, 340 are shown in position to direct the outlet part of the air flow generally upwardly as it exits the outlet end 326 of the housing 322. The inlet guide 334 is shown in the first inlet position, and the outlet sleeve 354 is shown in the first outlet position, in FIG. 22. It can be seen in FIG. 22 that the inlet guide 334 and the outlet sleeve 354 are positioned to direct the outlet part of the air flow as far upwardly upon exit as possible, given the positions of the inlet guide 334 and outlet sleeve 354 inside the cavity 332 in the housing 322. The air flow into the inlet end 324 is represented by arrow "4A". The inlet part of the air flow is directed by the inlet guide 334 in the direction indicated by arrow "$4B_2$" (FIG. 22). The inlet part of the air flow is directed toward the outlet guide 340. It will be appreciated by those skilled in the art that, when the inlet and outlet guides 334, 340 are positioned as illustrated in FIG. 22, only a portion of the inlet part of the air flow is directed through the outlet guide 340. The outlet part of the air flow is further directed by the outlet sleeve 354 upwardly, as represented in FIG. 22 by arrow "$4C_2$". The air flow exiting the housing 322 via the outlet end 326 generally is schematically represented by arrow "4D" in FIG. 22.

In FIG. 23, the inlet guide 334 and the outlet sleeve 354 are shown positioned to direct the outlet part of the air flow exiting the outlet end 326 of the housing 322 generally downwardly. The inlet guide 334 is shown in the second inlet guide position, and the outlet sleeve 354 is shown in the second outlet guide position, in FIG. 23. It can be seen in FIG. 23 that the inlet guide 334 and the outlet sleeve 354 are positioned to direct the outlet part of the air flow as far downwardly upon exit as possible, given the positions of the inlet guide 334 and the outlet sleeve 354 inside the cavity 332 in the housing 322. The air flow into the inlet end 324 of the housing 322 is represented by arrow "4A". The inlet part of the air flow is directed by the inlet guide 334 in the direction indicated by arrow "4B$_3$", toward the outlet guide 340 (FIG. 23). It will be appreciated by those skilled in the art that, when the inlet and outlet guides 334, 340 are positioned as illustrated in FIG. 23, only a portion of the inlet part of the air flow is directed through the outlet guide 340. The outlet part of the air flow is further directed by the outlet sleeve 354 downwardly, as represented by arrow "4C$_3$". The air flow exiting the housing 322 via the outlet end 326 generally is schematically represented by arrow "4D" in FIG. 23.

It is believed that the air flow through the vent outlet assembly 320 is subjected to a minimal pressure drop, partly because the inlet guide 324 is the planar body or blade 321.

From the foregoing, it can be seen that one embodiment of a method of the invention preferably includes a step of providing the outlet guide for guiding at least the outlet part of the air flow to the outlet end of the housing. As described above, the outlet guide preferably is pivotable about the outlet guide axis. Preferably, the inlet guide is also provided, positioned upstream from the outlet guide, for guiding an inlet part of the air flow including the outlet part of the air flow toward the outlet guide. The inlet guide is preferably pivotable about the inlet guide axis. In addition, the inlet guide and the outlet guide are operatively connected, for corresponding pivoting movement thereof about the inlet and the outlet guide axes respectively. An air flow is channelled into the housing at the inlet end. The outlet guide preferably is about the outlet guide axis, to guide the outlet part of the air flow in a selected direction substantially transverse to the outlet guide axis.

In one embodiment, the method additionally includes, with the outlet barrel(s) included in the outlet guide and pivotable about a transverse outlet guide axis that is substantially orthogonal to the outlet guide axis, guiding the outlet part of the air flow in a selected direction substantially transverse to the transverse outlet guide axis.

An alternative embodiment of the method includes, with the vane(s) included in the outlet guide and pivotable about the vane axis, guiding the outlet part of the air flow in a direction substantially transverse to the vane axis.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A vent outlet assembly for guiding an air flow comprising:
    a housing extending between an inlet end, into which the air flow is channelled, and an outlet end, from which the air flow exits the housing;
    the housing comprising a lower wall and an upper wall, each extending between the inlet and the outlet ends of the housing, the lower and upper walls at least partially defining a cavity therebetween;
    at least one inlet guide extending between first and second ends thereof and positioned at least partially in the cavity, the second end being located intermediate between the inlet and outlet ends, and the first end being located upstream to the air flow relative to the second end;
    at least one outlet guide extending between leading and trailing ends thereof and positioned at least partially in the cavity, the leading end being positioned proximal to, and at least partially aligned with, the second end of said at least one inlet guide, and the trailing end being positioned downstream to the air flow relative to the leading end;
    said at least one inlet guide being pivotable between a first inlet position, in which the second end of said at least one inlet guide is positioned proximal to the lower wall of the housing, and a second inlet position, in which the second end of said at least one inlet guide is positioned proximal to the upper wall of the housing, and said at least one inlet guide comprising at least one inlet sleeve;
    said at least one outlet guide being pivotable between a first outlet position, in which the leading end is positioned proximal to the lower wall of the housing, and a second outlet position, in which the leading end of the outlet guide is positioned proximal to the upper wall;
    said at least one inlet guide being positioned relative to said at least one outlet guide for guiding an inlet part of the air flow toward said at least one outlet guide;
    a connecting subassembly to simultaneously position said at least one inlet guide and said at least one outlet guide in the first inlet position and in the first outlet position respectively, and to simultaneously position said at least one inlet guide and said at least one outlet guide in the second inlet position and in the second outlet position respectively, and to simultaneously move said at least one inlet guide between the first and second inlet positions and said at least one outlet guide between the first and second outlet positions relative to each other, whereby an outlet part of the air flow comprised in the inlet part is directed through said at least one outlet guide;
    said at least one outlet guide comprising at least one outlet sleeve at least partially aligned with said at least one inlet sleeve;
    said at least one outlet guide additionally comprising at least one outlet barrel mounted in said at least one outlet sleeve, for directing a portion of the outlet part of the air flow therethrough; and
    said at least one outlet barrel extending between upstream and downstream ends relative to the direction of the air flow, and said at least one outlet barrel comprising a barrel cavity therebetween that tapers toward the downstream end, to cause the outlet part of the air flow that flows through the barrel cavity to accelerate toward the downstream end.

2. A method of at least partially directing an air flow from an inlet end of a housing to an outlet end thereof, the method comprising the steps of:
    (a) providing at least one outlet guide for guiding at least an outlet part of the air flow to the outlet end, said at least one outlet guide being pivotable about an outlet guide axis, said at least one outlet guide comprising at least one outlet sleeve and at least one outlet barrel mounted in said at least one outlet sleeve, said at least one outlet barrel extending between upstream and downstream ends relative to the direction of the air flow and comprising a barrel cavity therein that tapers toward the downstream end;

(b) providing at least one inlet guide positioned upstream from said at least one outlet guide, for guiding an inlet part comprising said outlet part of the air flow toward said at least one outlet guide, said at least one inlet guide being pivotable about an inlet guide axis, said at least one inlet guide comprising at least one inlet sleeve, said at least one outlet sleeve being at least partially aligned with said at least one inlet sleeve;

(c) operatively connecting said at least one inlet guide and said at least one outlet guide for corresponding pivoting movement thereof about the inlet and the outlet guide axes respectively;

(d) channelling the air flow into the housing at the inlet end; and (e) pivoting said at least one outlet guide about the outlet guide axis, to guide the outlet part of the air flow in a selected direction substantially transverse to the outlet guide axis, the outlet part of the air flow that flows through the barrel cavity accelerating toward the downstream end as the outlet part passes through the tapered barrel cavity.

\* \* \* \* \*